United States Patent
King et al.

(10) Patent No.: US 8,631,041 B2
(45) Date of Patent: Jan. 14, 2014

(54) SECONDARY LAZY-ACCESSIBLE SERIALIZATION OF ELECTRONIC CONTENT

(75) Inventors: James C. King, Santa Cruz, CA (US); Philip Levy, Los Altos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 2013 days.

(21) Appl. No.: 11/584,225

(22) Filed: Oct. 20, 2006

(65) Prior Publication Data

US 2008/0098018 A1 Apr. 24, 2008

(51) Int. Cl.
*G06F 17/30* (2006.01)
(52) U.S. Cl.
USPC .......................................... 707/796; 709/246
(58) Field of Classification Search
USPC .......................................... 707/796; 709/246
See application file for complete search history.

(56) References Cited

U.S. PATENT DOCUMENTS

| | | | |
|---|---|---|---|
| 6,928,488 B1 * | 8/2005 | de Jong et al. | 709/246 |
| 7,120,639 B1 | 10/2006 | de Jong et al. | |
| 2002/0056031 A1 | 5/2002 | Skiba et al. | |
| 2004/0243595 A1 | 12/2004 | Cui et al. | |
| 2005/0108627 A1* | 5/2005 | Mireku | 715/513 |
| 2005/0144622 A1* | 6/2005 | Ballinger et al. | 719/315 |
| 2006/0230070 A1 | 10/2006 | Colton et al. | |

FOREIGN PATENT DOCUMENTS

WO WO-2008060802 A2 5/2008

OTHER PUBLICATIONS

"Abstract: Lazy Remote Method Invoation (RMI)", [Online]. Retrieved from the Internet: <URL: http://www.cs.umd.edu/~gvijay/Academics/papers/ps/lazyrmi_paper.ps.gz, 24 pgs.
"International Application Serial No. PCT/US2007/081733, Search Report mailed Jun. 6, 2008.", 20 pgs.
Winters, Chris, "SPOPS::Manual::Serialization", [Online]. Retrieved from the Internet: <URL: http://search.cpan.org/dist/SPOPS/SPOPS/Manual/Serialization.pod>, 5 pgs.

* cited by examiner

*Primary Examiner* — Shahid Alam
*Assistant Examiner* — Dawaune Conyers
(74) *Attorney, Agent, or Firm* — Schwegman Lundberg Woessner P.A.

(57) ABSTRACT

In one embodiment, a method comprising selecting a first node included in a data structure, the data structure representing, in a node-and-link representation, a first portion of electronic content, the data structure including a first external link being associated with the first node, the first external link referencing a first serialization, the first serialization representing a second portion of electronic content in a representation differing from the node-and-link representation of the data structure, augmenting the data structure using the first serialization comprising constructing a set of new nodes, the set of new nodes including all nodes constructible from the serialization, selecting a target node from among the set of new nodes, inserting the target node into the data structure, and inserting a first inter-node link into the data structure, the first inter-node link connecting the first node and the target node, the first inter-node link corresponding to the first external link.

35 Claims, 27 Drawing Sheets

SECONDARY LAZY-ACCESSIBLE SERIALIZATION OF ELECTRONIC CONTENT

FIELD

This application relates to a method and system to enable as-needed loading of electronic content, and, in one example embodiment, to enable as-needed loading of electronic content from a serialization of differing granularity or format from an in-memory representation of the electronic content.

BACKGROUND

In recent years, a number of computerized applications for storing, retrieving, and displaying electronic content have come into wide use. With the advent of object-oriented and object-based paradigms throughout the software industry, the electronic content processed by such programs has been increasingly conceived in terms of a collection of separate objects, each object representing a particular content element, and the various objects structured to form the overall electronic content by being interconnected through a graph of linking data.

One example of electronic content conceived of as being composed of content elements encapsulated or described by objects is the ADOBE® Portable Document Format (PDF). In a PDF document, various content elements, such as pages, fonts, color descriptors, graphical elements, and so forth are represented by discrete objects within the document.

Representing electronic content as a collection of interconnected objects encapsulating content elements allows for comparatively efficient processing when the electronic content is to be written out to, or read in from, a serialized form such as for example a file providing random-access capability. However, if a new storage format, such as one in which the electronic content is divided into a number of separate serializations, is to be used, significant new programming code is typically needed to handle the translation between the new storage format and the internal data structure by which the content is rendered and/or edited. In addition, a storage format constructed of several serializations may not be conducive to on-demand or "lazy" loading. The inability to be able to do "lazy access" in rendering or otherwise making an electronic content accessible for in-memory manipulation typically causes the user to be made to wait for the entire electronic content to be loaded before being able to view, edit, or access any part of the content.

BRIEF DESCRIPTION OF DRAWINGS

Some embodiments are illustrated by way of example and not limitation in the Figures of the accompanying drawings in which.

DETAILED DESCRIPTION

Figure 1:
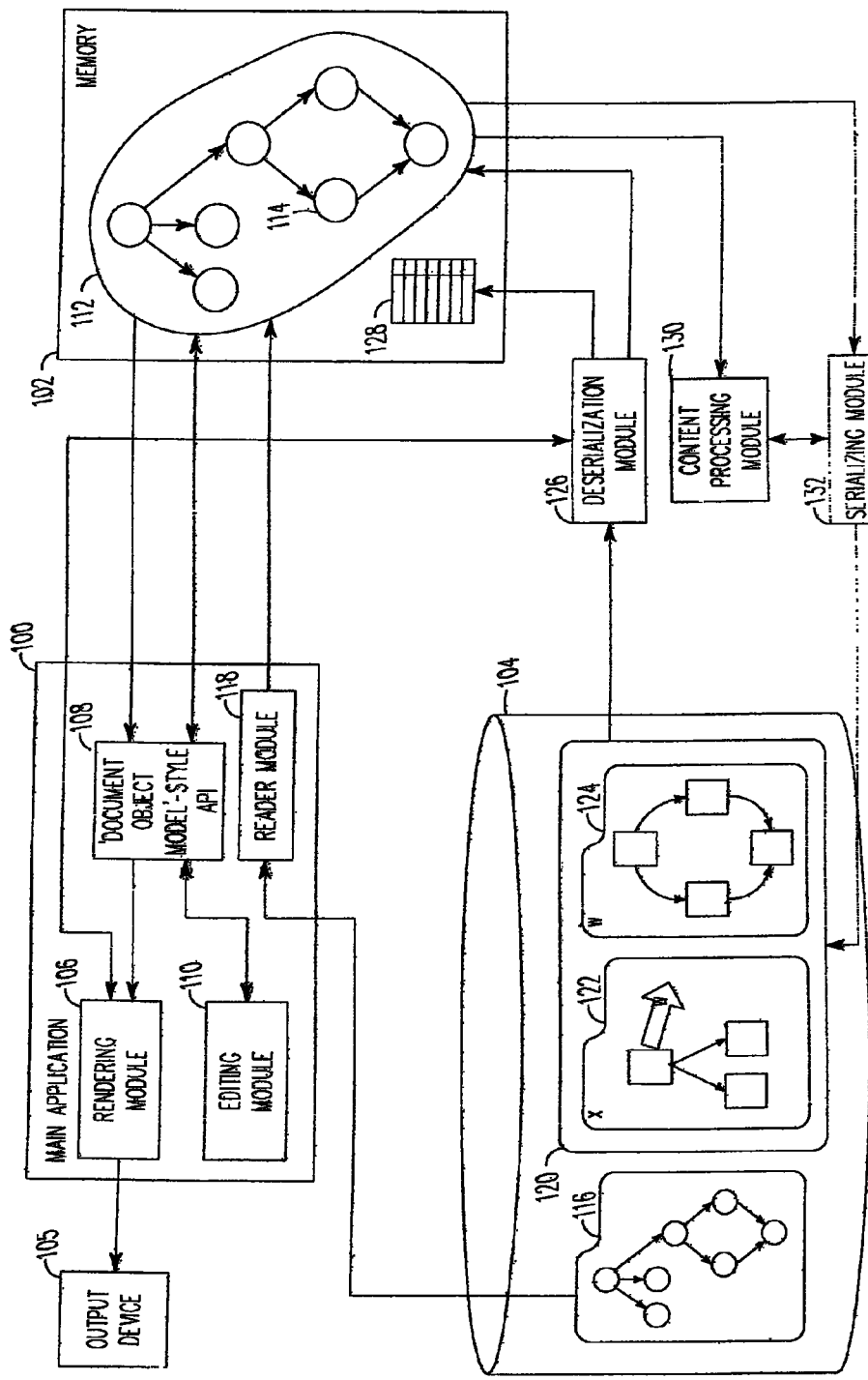
FIG. 1 is a block diagram illustrating an example system for reading and writing electronic content to and from a second serialization, according to an example embodiment.

In the following description, for purposes of explanation, numerous specific details are set forth in order to provide a thorough understanding of some example embodiments. It will be evident, however, to one skilled in the art that the present invention may be practiced without these specific details.

Embodiments may, for example, be implemented as a stand-alone application (e.g., without any network capabilities), a client-server application or a peer-to-peer (or distributed) application. Embodiments may also, for example, be deployed by Software-as-a-Service (SaaS), Application Service Provider (ASP), or utility computing providers, in addition to being sold or licensed via traditional channels.

Introduction

For the purposes of this specification, the term "electronic content" shall be taken to include any digital data that may be presented to or accessed by a consumer (e.g., visually or audibly presented) and may include an electronic document, page-descriptive electronic content such as a page-descriptive electronic document, media stream, web page, hypertext document, image, digital video, digital audio, an animation, merely for example. A "content element" shall include any part or share of electronic content that is defined or is discernable as a part or share. For example, a content element may be automatically discerned from a characteristic of the content element itself (e.g., a paragraph of an electronic document) or may be manually defined by a user (e.g., a user-selected collection of words in an electronic document, a user-selected portion of a digital image). Examples of content elements include portions of a page-descriptive document or other electronic document, such as, for example, pieces of electronic text or other material within the electronic document, portions of media streams such as sections of digital video or frames or sets of frames of digital video or digital audio, segments or frames of animations, and various elements presentable or accessible by users within electronic content, and the like. Content elements may include empty content, for example an electronic document may include a blank page; the content of the blank page, namely any data indicating its blankness, may in some embodiments be considered as a content element, namely an empty content element. Content elements may include format data such as, for example, position information describing the placement of other content element(s), or information specifying colors or fonts to be used in rendering other content element(s).

For the purposes of this specification, the term "page description language document" may include a page-descriptive document that is stored in one or more files or other storage units. Such files may, in an example embodiment, be coded in a language suited for describing a rendition of documents (e.g., in a manner in which the documents may be rendered into a set of print pages).

For the purposes of this specification, the term "rendering" includes presenting or making accessible electronic content or content elements to be perceived, viewed, or otherwise experienced by a user, or be made available for further processing, such as, for example, searching, digesting, printing, analyzing, distilling, or transforming by computational processes that need not include processing the intrinsic data structure describing the electronic content or content element. Whether a content element associated with an electronic content is included in the rendering of the electronic content may, by default, be determined by whether or not the content element is active.

For the purposes of this specification, the term "data structure representing electronic content" may include any arrangement of data into related and identifiable pieces to facilitate rendering and/or processing of the electronic content.

For the purposes of this specification, a "node-and-link representation" may include a data structure in which parts or segments of the electronic content are stored or otherwise associated with identifiable objects (e.g., nodes) and the relationships between the various content elements stored in the nodes are represented by links. The links may serve to connect or join nodes into a configuration and may correspond to relationships between the content elements stored at the respective nodes.

For the purposes of this specification, the term "inter-node link" may include a link in the node-and-link data structure between two nodes. In certain example embodiments, the two nodes may be stored within a memory randomly accessible by a computer.

For the purposes of this specification, the term "external link" may include data associated with a node that is stored as part of a data structure in a node-and-link representation, but which indicates that a second node to which the node is connected is constructible from a serialization. The external link may include data identifying the serialization from which the second node may be constructed and may include other data facilitating the construction and/or identification of the second node constructible from the serialization.

An inter-node link may be unidirectional, in which case it may be traversed by a computational process in one direction from a particular node (which may be termed the "source node") to another node (which may be termed the "sink node"), or an inter-node link may be bidirectional—traversable starting from either of the nodes it connects. An inter-node or external link may be said to be "incident" to a node if it connects to that node. In some embodiments, links may be extrinsic to the data object describing the node, and in some embodiments, links may be part of the data object describing their source node.

For the purposes of this specification, the term "content portion" may include any portion of an electronic content, such as for example a combination, grouping, or collection, whether user-defined or not, of one or more content elements.

For the purposes of this specification, the term "semantically-defined content portion" may include a portion of an electronic content which may be comprised of one or more content elements that are related to one another according to some semantic, conceptual, symbolic, or semiotic relationship.

When a data structure representing electronic content is stored in a memory or other random access device, it may be desirable to write out the electronic content onto a storage medium, such as a disk in which files are arranged in a sequential data organization. This process of transforming from a data structure suitable for random access within a memory to a data structure suitable for storage on a computer-readable medium in a sequential or serial organized file may be termed "serializing" the data structure. The resulting file or other representation stored on the computer-readable medium may be referred to as a "serialization" of the data structure. Serialization may occur with respect to an entire data structure, or with respect to some part or portion of a data structure.

For the purposes of this specification, the phrase "constructible from a serialization", as may be applied to one or more nodes, inter-node links, or external links, may indicate that, given a serialization, and in some embodiments, further information intrinsic or extrinsic to this serialization, the node(s) or link(s) may be constructed from information contained in the serialization. In this specification the term "reconstructible" is also used in contexts in which prior serializing of the node(s) or link(s) is also being discussed or alluded to.

In processing or otherwise accessing or carrying out computations with respect to a data structure organized in a node-and-link representation, the term "signifier node" may, for purposes of this specification, include a node that contains content elements or other data that either alone or in combination with data stored in other nodes permits a computer or other processing module to determine that the node is part of a sub-structure of the data structure corresponding to a piece of semantically-defined content, such as a semantically-defined content portion.

For example, suppose that an electronic document, including a table of contents and one or more pages, is stored in a memory in a node-and-link representation. Suppose further that it is desired to access the table of contents. In an example node-and-link representation, the table of contents may be stored within a number of nodes, with each table of contents entry stored in a separate node, and a single table of contents root node including data identifying it as the root node. In this example, where the semantically-defined content portion is the table of contents as a whole, the table of contents root node may serve as a signifier node to allow a computer to identify the portion of the electronic document corresponding to the table of contents by examining the table of contents root node, and thence following links attached or incident to that root node to access the table of contents entry nodes.

Thus, a computer may locate or distinguish the set of nodes in a node-and-link representation data structure that store a semantically-defined content portion by identifying a signifier node and the set of nodes connected either directly or indirectly to that signifier node. A semantically-defined content portion stored within a node-and-link representation may include one or more signifier nodes.

In the process of serializing an electronic content stored in a node-and-link representation, it may be desirable to divide the node-and-link representation into a number of components, each component corresponding to a semantically-defined content portion of the electronic content as a whole. These serializations may store the electronic content in representations differing from the node-and-link representation from which the serializations were derived. In some embodiments, the serializations may also be themselves structured in a node-and-link representation format that differs from the node-and-link representation from which the electronic content portions were previously serialized. In some other embodiments, the serializations may store the electronic content portions in a representation that is not substantially a node-and-link representation, but from which the original node-and-link representation may be reconstructed.

When a serialization is to be used to facilitate the reconstruction of the node-and-link representation from which it was originally derived or serialized, the serialization may include one or more types or fields of data that facilitate, either by themselves or in some embodiments, in combination with data stored in or associated with other serializations, such reconstruction. Some examples of such reconstruction-facilitating data may include information describing the content portion stored in the serialization, information describing the format of the serialization, information describing the content of the serialization, information serving as a header for the serialization, a type indication such as, for example, a file name extension that may indicate the type of the serialization, an identifier of the serialization such as, for example, a file name, and combinations of these types of information.

Example System for Secondary Electronic Content Serialization Reading and Writing FIG. 1 illustrates an example system for reading and writing electronic content to and from a second serialization, according to an example embodiment. The system of FIG. 1 includes three components: a main application 100 such as an electronic document editing and rendering system, a storage device 104 such as a hard disk or other mass storage device, and a memory 102. In some embodiments, the main application 100 such as, for example, a document editing and rendering application may include a number of components or modules. These modules include a rendering module 106, an editing module 110, a 'document object model'-type application programmer interface (API) 108, and a reader module 118. In addition three other modules are illustrated in FIG. 1: a content processing module 130, a serializing module 132 and a deserialization module 126. These modules may be included within the main application 100, or may be separate applications or processes that are callable or invocable by the main application 100 and/or by other applications. The system illustrated in FIG. 1 may also include an output device 105, such as for example a computer monitor, video card or other device or module capable of receiving data and presenting it, or preparing it to be presented to a user.

For purposes of illustration, the memory 102 may contain a node-and-link data structure 112 (indicated by a surrounding dashed oval), in a node-and-link representation including, for example, node 114. The memory 102 may also contain a node lookup table 128, whose function is described below.

The rendering module 106 may use the 'document object model'-type API 108 to retrieve information describing electronic content from the memory 102, such as electronic content stored in the data structure 112. The rendering module 106 may process the data or information contained in the data structure 112 as accessed through the 'document object model'—type API 108 and may, in some embodiments, process that information into a form suitable for presentation to a user, in order to relay information as formatted and/or processed to output device 105. In some embodiments, the main application 100 may include an editing module 110 that may be used to edit the electronic content represented by the data structure 112, with the resulting changes in the electronic content being updated into the data structure 112, in some embodiments, via the 'document object model'-type API 108.

The editing module 110 may access the electronic content stored in data structure 112 both for reading, and for modification of the data structure 112, via the 'document object model'-type API 108.

The reader module 118, which may in some embodiments be part of the main application 100, may be used for accessing one or more files 116 that may represent or store electronic content in a further node-and-link representation that is substantially similar to the node-and-link representation of the electronic content as it may be represented by the node-and-link representation data structure 112 as stored in memory 102. The reader module 118 may serve to read from files formatted in such a node-and-link representation, such as file 116 and store the electronic content from those files into memory 102 in a node-and-link representation substantially similar to the node-and-link representation of the file from which the electronic content was read.

A content processing module 130, which may in some embodiments be a part of the main application 100, and a serializing module 132, which may also be a part of the main application 100, are in some embodiments responsible for storing electronic content represented in a node-and-link representation into a serialization formatted differently from the node-and-link representation 112 in which the electronic content may be stored in memory 102. The content processing module 130 may in some embodiments access the data structure 112 representing an electronic content and identify, from the data structure 112, a number of data structure portions representing semantically-defined content portions of the electronic content. The operations of the content processing module 130 are described in more detail below. The serializing module 132 may, with input from the content processing module 130, serialize portions of the structure 112 into one or more serialization files 122 and 124 a different representation from the data structure 112. These serialization files may be contained in a package 120, stored, in some embodiments as sub-files of the package. The package 120 may be, for example, a compressed storage file, such as for example a ZIP or WinZip file, or a directory sub-tree of a directory hierarchy of the storage device 104. Serialization files 122 and 124 may be stored on a storage device 104.

In referring to FIG. 1, it will be appreciated that a number of pictorial conventions are present which are further utilized throughout this specification. Illustrations of node-and-link representation data structures are illustrated such as within the file 116 and within the memory 102 in which nodes are represented by circular glyphs (e.g., node 114) while inter-node links are represented by arrows indicating the direction of the link or association. By contrast, serializations in which information is stored in a representation differing from the node-and-link data structures representing electronic content are shown using rectangular dashed nodes and dashed links to suggest that the nodes and links themselves are not explicitly stored as such in the files in which they are shown, but rather that information from which those nodes and links may be reconstructible, such as by deserialization module 126, is stored in those files. For example, the package 120 includes two serialization files: the file 122 and the file 124. The file 122 has the file name "X" while the file 124 has the file name "W". A small dotted arrow that contains the letter "W" is illustrated in the file 122. This arrow represents an external link between a node that is constructible from the data in file X and a node constructible from the file 124. The processes for generating, and reconstructing node-and-link representation from serializations such as those illustrated in package 120 is described below.

Example Methods for Generating Serializations

In the following paragraphs, a number of example methods and processes are described for generating, for electronic content stored in data structures making use of node-and-link representations, one or more serializations, according to example embodiments. These serializations may use a different representation format from the node-and-link representation of the internally stored data structure.

There are a number of reasons why representations used in the serializations may be more appropriate to the serialization than the node and link representations. For example, a node and link representation may not be suitable a representation for some processing applications nor may it be suitable for a human to create or read. Node and link representations may be in a binary format, while a serialization may be in a more textual format and thus more amenable to text tools such as editors. For example, in an electronic document a paragraph of text may be more easily represented in a serialization by a string of characters (such as to facilitate human reading and editing) whereas in a machine-internal representation it may be more convenient (e.g., for purposes of rendering) store it as a node and link structure, for example, where each line of text is a node and the nodes are linked together to form the sequence of lines that forms or constitutes the paragraph being represented by the node and link structure.

Furthermore, there may be a strong desire by developers to represent as much information as possible in a markup language (as may be used in a serialization) such as the extensible markup language (XML) to facilitate processing of the serialization by common tools.

In some embodiments, node-and-link representations may contain information (e.g., inter-node links) that facilitate optimizing computational operations but may complicate manipulation. For example, a list of items may be represented in a node-and-link representation as a doubly-linked list of items to facilitate more rapid processing or searching in a computer memory where links may be maintained despite changes. On the other hand, in a serialization the list of items may be represented as a serial list without explicit links since the ease of editing the serialization rather than computational efficiency may be more of a factor in serializations.

In addition, the organization of the information (e.g., describing an electronic content) in the serialization may be more suited to incremental load because, for example, the electronic content may be divided into multiple files based on expected access patterns in the process of rendering or otherwise processing the electronic content.

Figure 2:
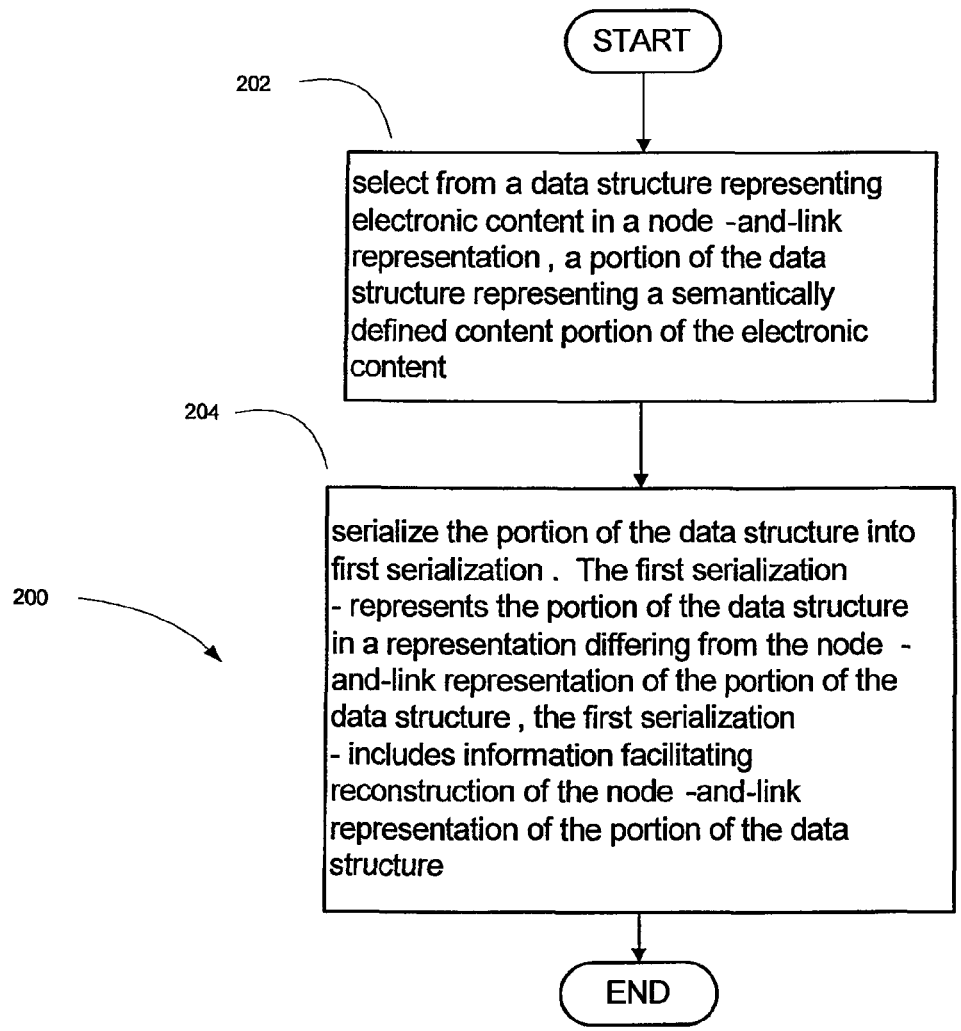
FIG. 2 is a flowchart illustrating a method for serializing a portion of a node-and-link data structure storing electronic content, according to an example embodiment.

In addition, data import/export formats may be easier to generate in text-based formats, FIG. 2 is an overview flowchart of a method 200 to serialize a portion of a node-and-link data structure storing electronic content, according to an example embodiment. At block 202, a portion of the data structure that represents a semantically-defined content portion of the electronic content represented by the data structure is selected. At block 204, the selected portion of the data structure is serialized into a first serialization. The first serialization represents the portion of the data structure in a representation differing from the node-and-link representation of the portion of the data structure. The first serialization includes information facilitating the reconstruction of the node-and-link representation of the portion of the data structure.

It will be appreciated that the method 200 may be repeated several times with respect to a complete data structure representing an electronic content so that all of the semantically-defined content portions of the data structure are each stored, for example as separate serialization files, into a package 120 or other aggregation in a storage device 104.

In some embodiments, block 202, in which a portion of the data structure is selected, may include further intermediate processing. In some embodiments the content processing module 130 may traverse or otherwise examine the data structure and in so doing recognize content stored in one or more signifier nodes as being part of a semantically-defined content portion. Once the content processing module 130 has recognized one or more signifier nodes that signify the presence of a semantically-defined content portion, the content processing module 130 may identify the set of nodes connected either directly or indirectly to the signifier node(s). This set of nodes may include the information representing content elements that are semantically-related to the information in the signifier nodes. Finally, the content processing module 130 may identify a set of links (e.g., inter-node links and/or external links) that are incident to the set of nodes identified as connected to the signifier node(s). This portion of the data structure (which may include one or more signifier nodes, the set of other nodes connected indirectly or directly to the signifier nodes and the set of links incident to the set of nodes) may be taken to represent the portion of the data structure that contains a semantically-defined content portion. Once this portion has been selected, the serializing module 132 may serialize this portion.

The method 200 illustrated in FIG. 2 may include, as part of the selection of a portion of the data structure in block 202, the identification of the nodes that are included and excluded from the portion of the data structure that is to be serialized at block 204. The portion of the data structure to be serialized may be written out into a serialization and in the process the nodes of the portion of the data structure that is serialized may be removed from the data structure as well as the inter-node links that connect nodes that were so removed. Nodes that are not in the portion that is to be serialized may have inter-node links that connect those nodes in the data structure. In the process of serializing the portion of the data structure, these 'dangling' inter-node links may replaced by external links in the remaining, not (yet) serialized portion of the data structure.

These external links serve to facilitate the reconstruction of nodes and inter-node links from a serialization when that serialization is read in from a storage device 104 by a deserialization module 126.

Figure 3:
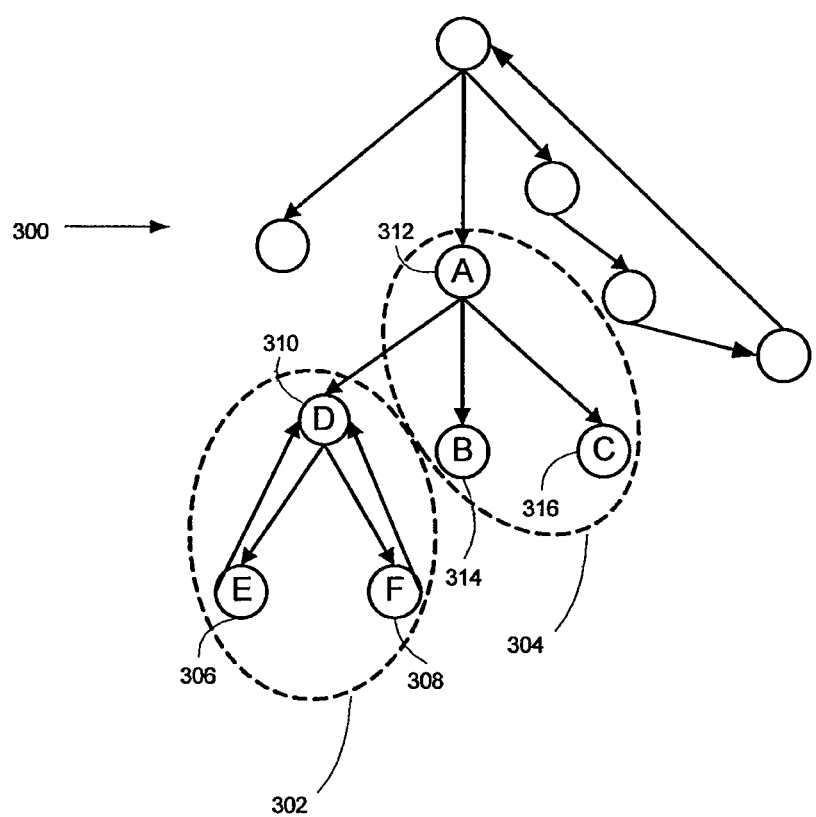
FIGS. 3-5 is a block diagram illustrating an example of the partial serialization of an example data structure, according to an example embodiment.
Figure 4:
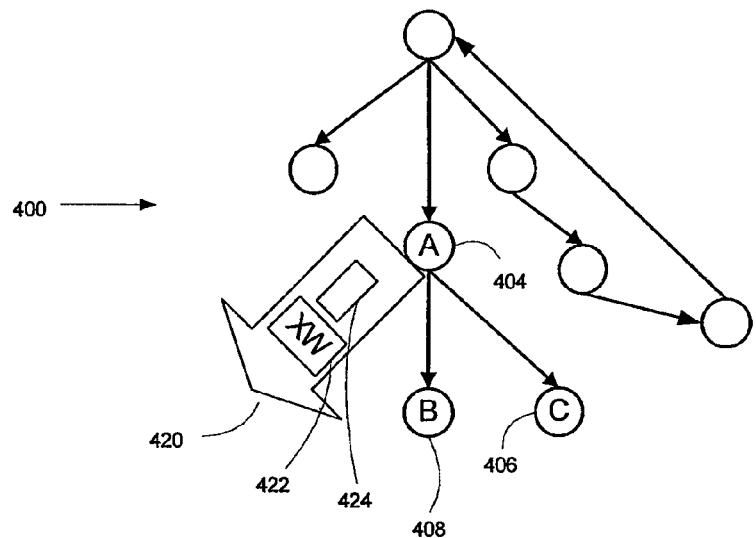
Figure 4:
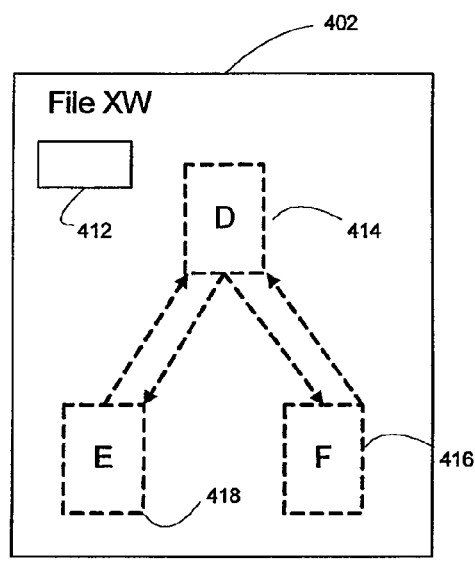
Figure 5:
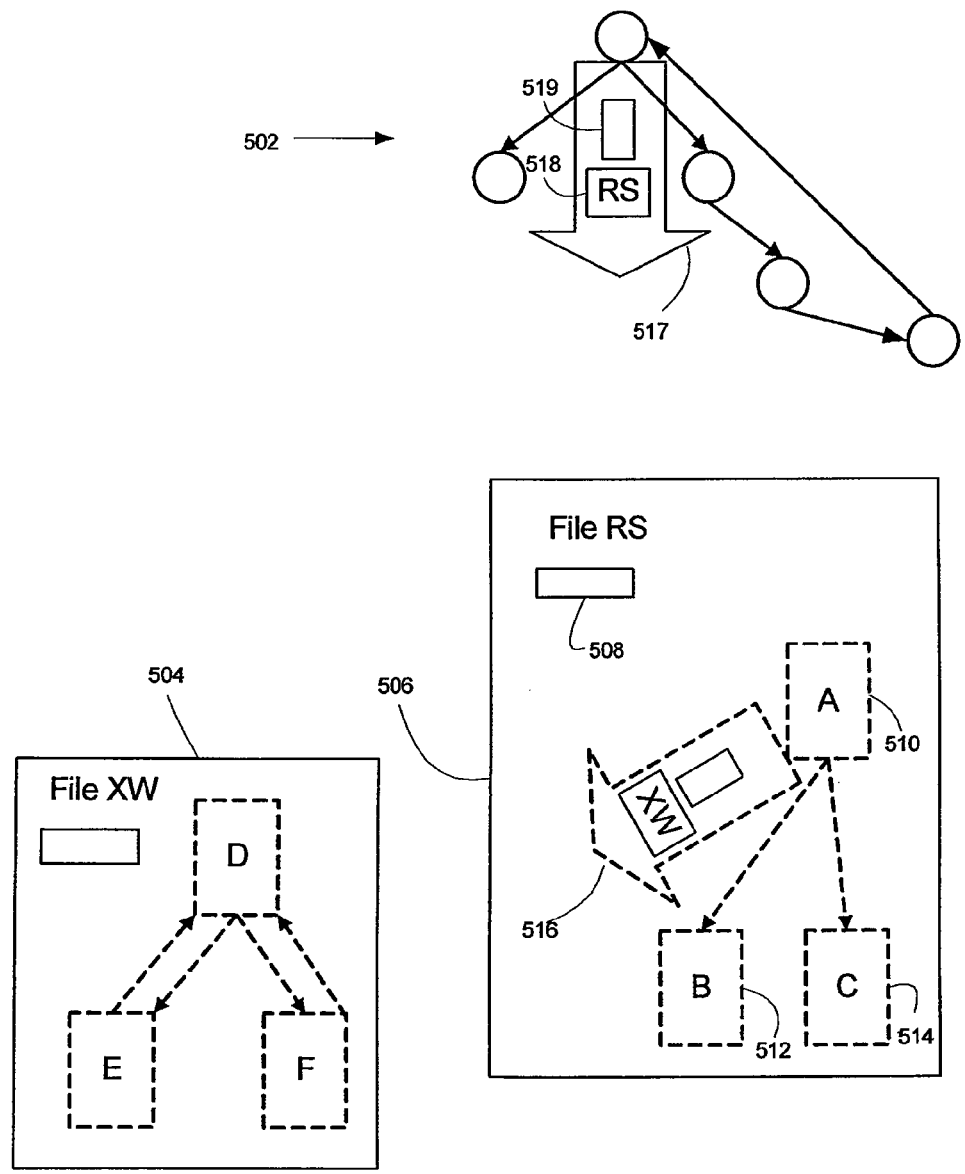

FIGS. 3 through 5 illustrate an example of the partial serialization of an example data structure, according to an example embodiment. A node-and-link representation data structure 300 is illustrated in FIG. 3 as may be stored in memory 102. Among the 11 nodes illustrated in the data structure 300 are node A 312, B314, C316, D310, E306 and F308.

Suppose, for purposes of example, the three nodes D 310, E 306 and F 308 are included along with their incident links in a semantically-defined portion of the data structure 300 as indicated by the dashed oval 302. Suppose further that the nodes A 312, B 314 and C 316 are included in a second semantically-defined portion of the data structure indicated by the oval 304 along with the A to B and A to C inter-node links.

In the first operation of a process to serialize the data structure 300 it may be desirable to serialize the portion of the data structure indicated by oval 302. This serialization may be carried out by the content processing module 130 and the serializing module 132 in a process, such as for example, method 200.

In carrying out the serialization process of the data structure 300, the content processing module 130 may select the portion of the data structure indicated by oval 302 as the portion to be serialized as a first operation in serializing all of data structure 300. The serializing module 132 may then serialize the portion of the data structure indicated by oval 302, with the content processing module 130 subsequently removing nodes D 310, E 306 and F 308 from the data structure 300 and replacing the link from A to D with an external link.

The situation resulting from this first operation of the process of serializing the data structure 300 is illustrated diagrammatically in FIG. 4, according to an example embodiment. It will be appreciated that the portion of the data structure 300 that is indicated by ellipse 302 has been removed from the data structure 400. While nodes A 404, B 408 and C 406 remain as part of the data structure stored in memory 102, it will be appreciated that nodes D 310, E 306 and F 308 have been removed. The inter-node link between nodes A 312 and D 310 in FIG. 3 has been replaced by the external link 420. This external link may include file name data 422 that indicates a file containing information from which the nodes D, E and F may be reconstructed. External link data 424 that may facilitate the reconstruction of the node-and-link representation of a portion of electronic content stored in the file indicated by the file name data 422. Serialization file XW 402 may include, for purposes of this example, information describing the portion of electronic content stored in serialization file XW. Serialization file XW 402 may include serialization data 412 which may include data facilitating the reconstruction of the node-and-link representation of the portion of electronic content stored in serialization file XW. Serialization data 412 may also include information that may be used to reconstruct the nodes D 310, E 306 and F 308. The information in serialization file XW 402 that may be used to reconstruct the nodes D, E, F is illustrated symbolically with rectangles 414, 418 and 416 respectively with data necessary to reconstruct the inter-node links among these nodes illustrated by the dotted arrows.

As mentioned above, the depiction of the portion of the data structure 300 that was serialized into serialization file XW is shown using dashed rectangular nodes and dashed inter-node links to indicate that, although the information stored in serialization file XW is not formatted in a manner substantially similar to the node-and-link representation of the portion of the data structure, the node-and-link representation is reconstructable using data information stored in serialization file xw.

Having serialized the portion of the data structure 300 indicated by oval 302, the serialization process of the data structure 400 may proceed with the serialization of the portion of the data structure indicated by oval 304. In this example, the nodes A 404, B 408 and C 406 and the inter-node links and external link 420 incident to these nodes are included in the portion of the data structure indicated by oval 304. The content processing module 130 may select the nodes A 404, B 408 and C 406 as being a portion of the data structure 400 representing a semantically-defined portion of the electronic content represented by the data structure as a whole (e.g., data structure 300.) The serializing module 132 may serve to then serialize this portion of the data structure. The result of this selection and serialization process is illustrated in the example FIG. 5.

In FIG. 5, a serialization file XW 504 is shown, as in FIG. 4. In addition, a serialization file RS 506 is shown, which may be stored in a package 120 in storage device 104, and includes a number of pieces of information. Serialization data 508 may include information useful for reconstructing the node-and-link representation of the information stored in serialization file RS 506 and serialization file RS 506 may also include information facilitating the reconstruction of nodes A 404, B 408 and C 406 as indicated by the rectangles 510, 512 and 514 respectively. Serialization file RS 506 may also include information 516 facilitating the reconstruction of the external link from a reconstructed node A that refers to serialization file XW 504.

It will be appreciated that the nodes A, B and C are removed from the remainder of the original data structure 502. In addition, it will be appreciated that the inter-node link in data structure 300 from the top node to node A 312 has been removed and replaced by the external link 517 that includes serialization identification data 518. External link 517, in this example, refers to serialization file RS 506 and includes reconstruction facilitation data 519 which may be used to facilitate reconstruction of the node-and-link representation from information stored in serialization file RS 506.

An example of the kind of information stored in the reconstruction facilitation data 519 may be information identifying which node out of the various nodes reconstructable from the information in serialization file RS 506 to connect by an inter-node link to the top node. In this example, that would be a node corresponding to node A 312 of the original data structure 300.

Further processing of the remainder of the original data structure 502 may result in the complete serialization of the data structure 300 into three or more separate serialization files, including serialization file RS 506 and serialization file XW 504.

Figure 6:
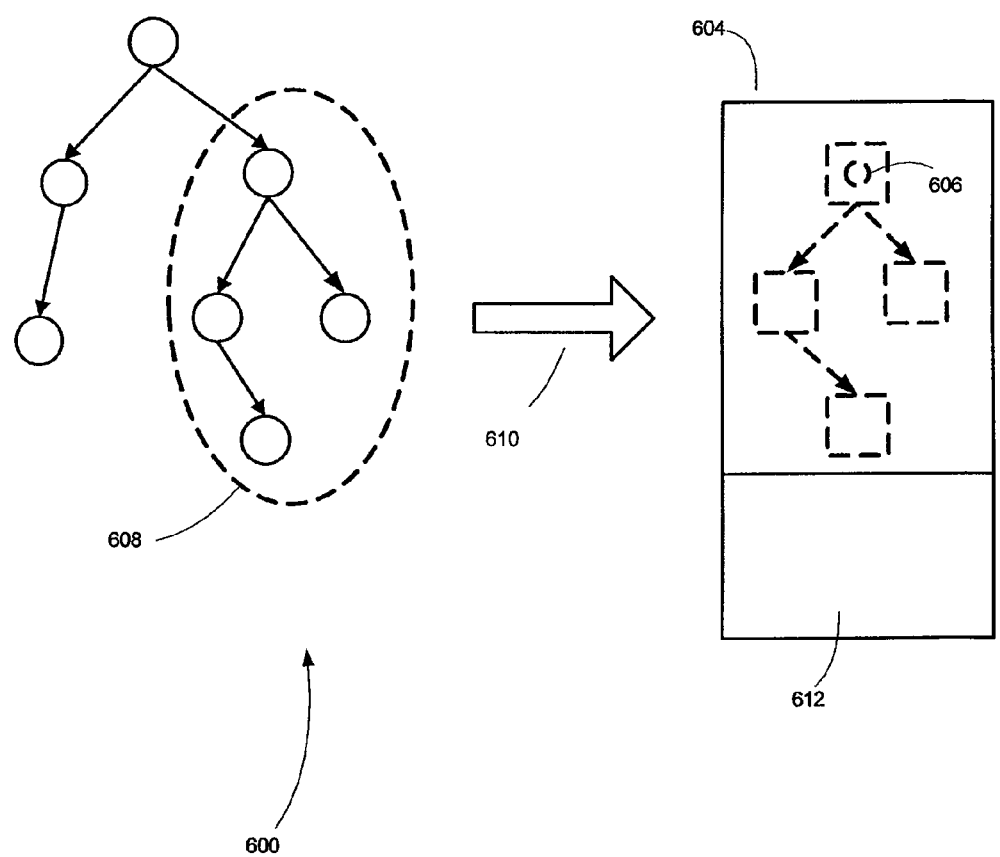
FIG. 6 is a block diagram illustrating a further process for serializing a portion of a node-and-link data structure, according to an example embodiment.

FIG. 6 illustrates a process for serializing a portion of a data structure, according to an example embodiment. The portion of electronic content represented in the portion of data structure indicated by oval 608 may be transformed into a different representation for storage into serialization file 604, this transformation being indicated by the arrow glyph 610.

The serialization file 604 may include information that may be used to reconstruct the nodes and links per se of the node-and-link representation of the portion of the electronic content. The serialization file 604 may also include information facilitating generally the reconstruction of the node-and-link representation as indicated in by blocks 612. The dashed circle 606, in the dashed rectangle, represents information indicating that the information depicted as the top rectangle in the serialization file 604 is to be reconstructed as the top node of the corresponding node-and-link representation of the portion of electronic content stored in serialized form in serialization file 604.

Figure 7:
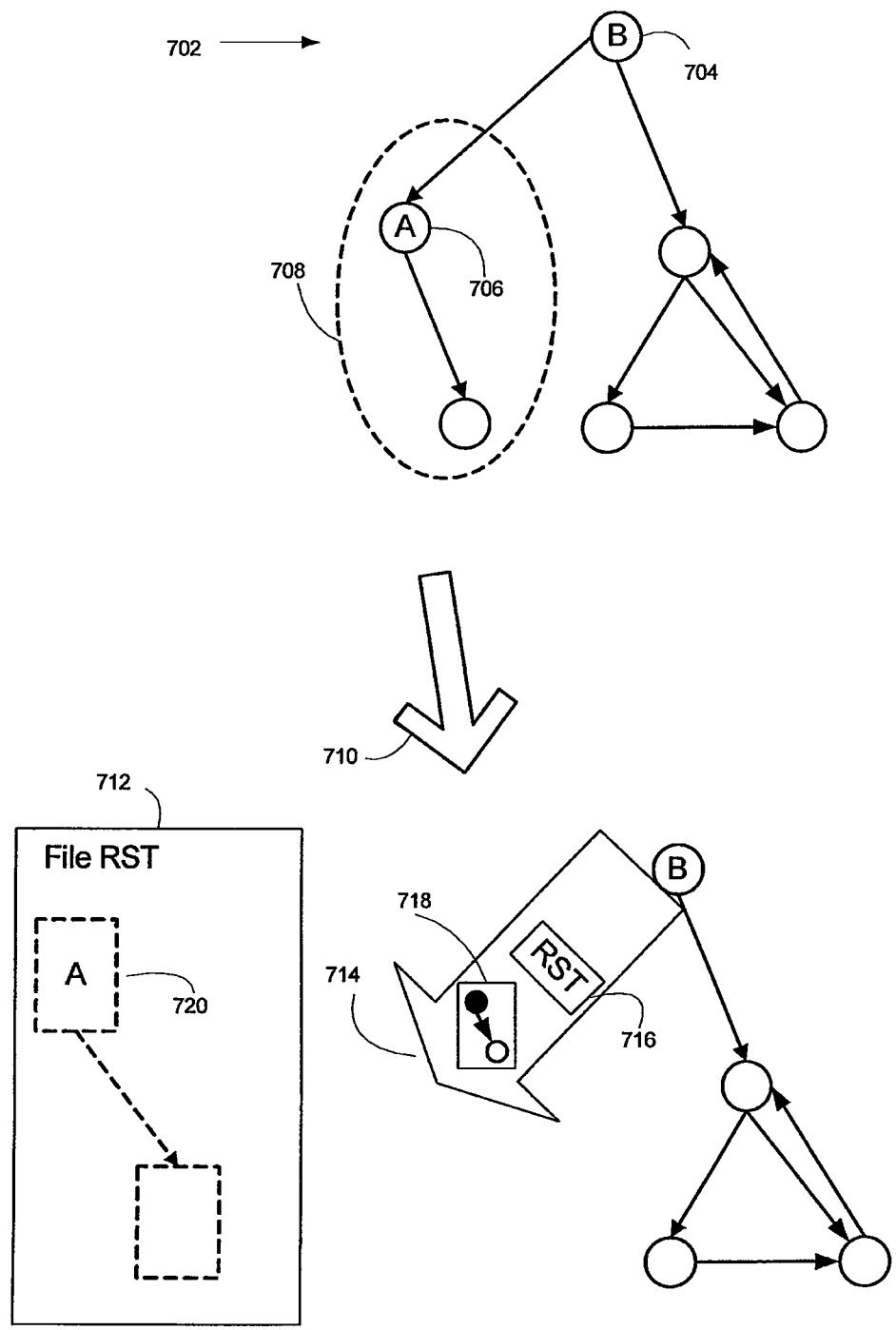
FIG. 7 is a block diagram providing a further illustration of a process of serializing a portion of a node-and-link data structure, according to an example embodiment.

FIG. 7 shows a yet further diagrammatic illustration of the process of serializing a portion of a node-and-link data structure, according to an example embodiment. In FIG. 7, the transformation from a single node-and-link data structure into a serialization file of a portion of that data structure and an annotation of the remainder of the data structure to facilitate a reconstruction of the original node-and-link data structure is shown; this transformation is indicated by the arrow 710. In the original data structure 702, the top node B 704 and another node A 706 are identified. The oval 708 indicates the portion of the data structure that is, in this example, being serialized. As a result of processing by the content processing module 130 and the serializing module 132, the serialization file RST 712 may be created including information facilitating the reconstruction of node A 706 (indicated by the dashed rectangle 720) as well as the reconstruction of the node below node A and the inter-node link connecting them. The portion of the data structure 702 indicated by oval 708 has been removed as a result of the serializing of that portion of the data structure and the inter-node link from node B 704 to node A 706 has been replaced by an external link 714. The external link includes serialization identification data 716. The external link also includes, in this example, an indication of the reconstructed node out of the nodes reconstructible from serialization RST that is to be connected by an inter-node link to top node B. In this diagram, the indication is illustrated by the top node in the miniature icon 718 being filled, the top node at the miniature icon corresponding to the node reconstructible from the information in serialization file RST 712 indicated as block 720.

Topologically Transforming Serialization Examples

FIGS. 8 through 11 illustrate diagrammatically example ways in which portions of data structures representing electronic content in a node-and-link representation may be transformed into information contained in serializations in differing representations, according to example embodiments.

Figure 8:
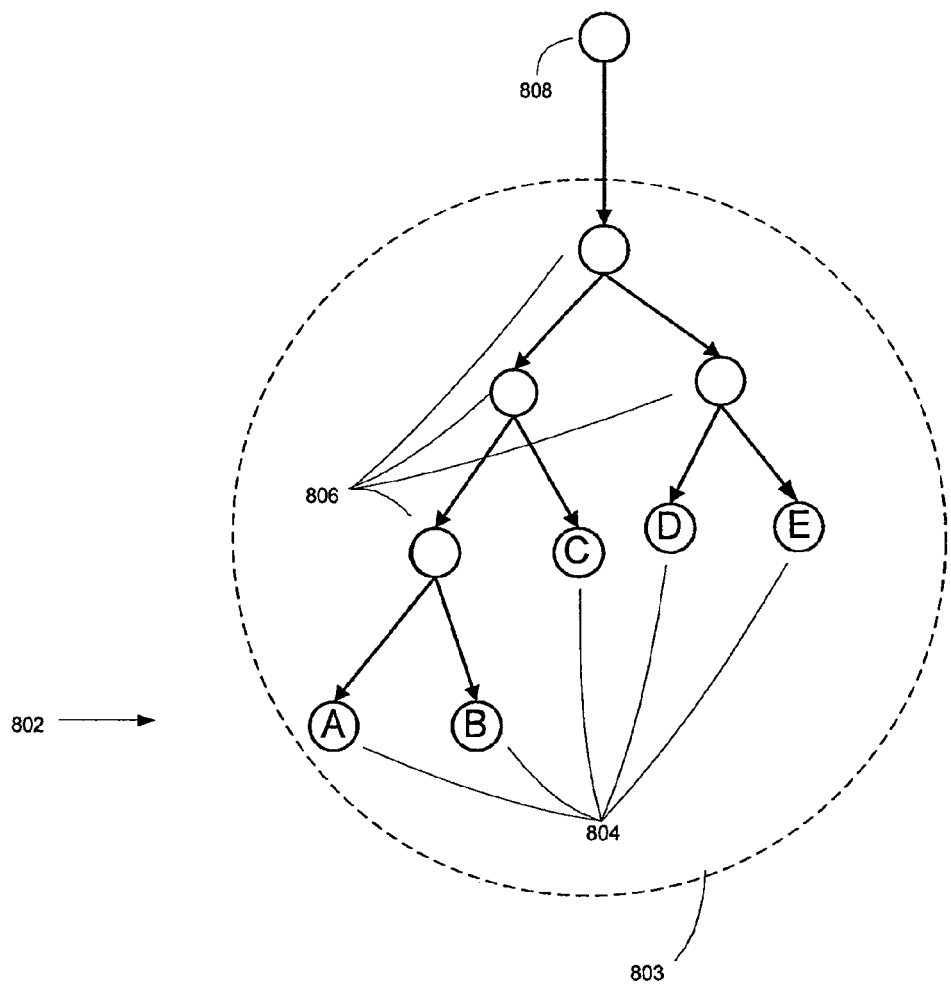
FIGS. 8 and 9 are flowcharts illustrating a method in which a portion of data structure serving as a binary search tree may be transformed into information contained in serialization omitting internal nodes, according to an example embodiment.
Figure 9:
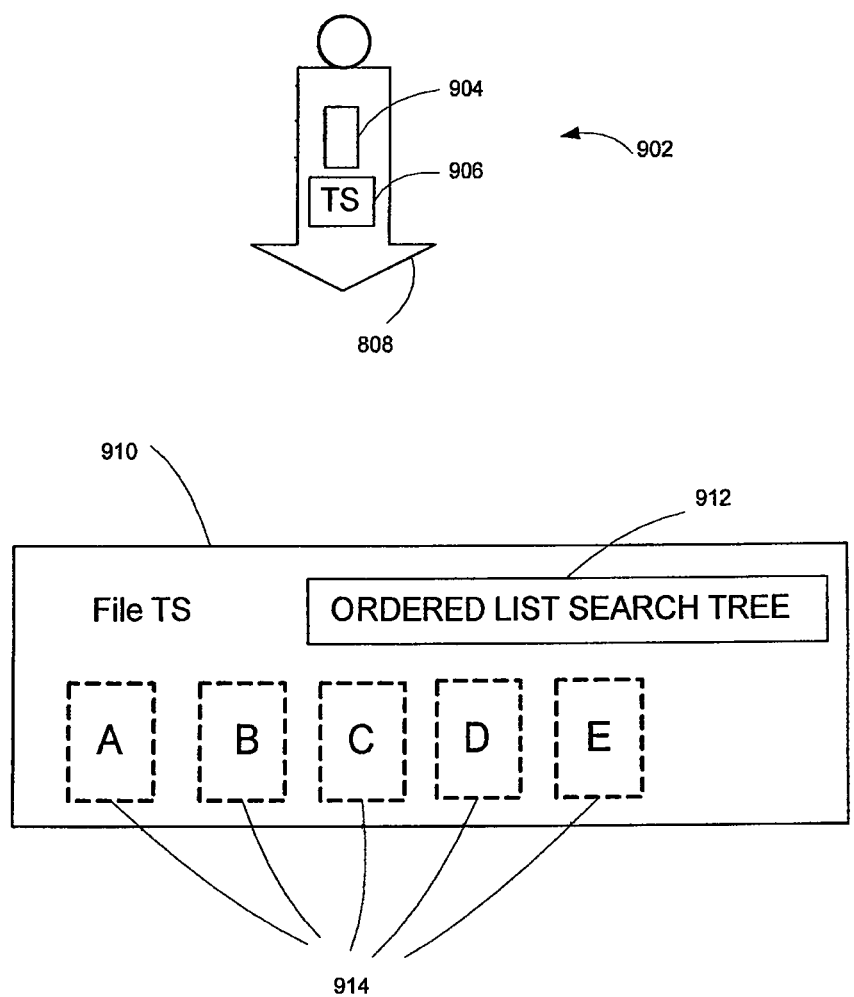

FIGS. 8 and 9 illustrate a process to serialise a portion of a data structure representing electronic content in which the portion of the data structure is in the form of a binary search tree, according to an example embodiment.

FIG. 8 illustrates an example data structure in a node-and-link representation, the data structure indicated generally as 802. The example data structure 802 includes a top (e.g., root) node 808 as well as a portion serving as a binary search tree indicated by the oval 803. The nodes within the binary search tree portion are divided into leaf nodes labelled A, B, C, D 840 and four internal nodes 806. In some embodiments, a binary (or other type of) search tree may be serialized into a linear list of the content elements searchable within the tree and reconstruct the internal nodes into memory 102 at such time as the serialized linear list of content elements is deserialized, for example, when the data structure representing electronic content with which the content elements are associated, is being reconstructed.

FIG. 9 illustrates a serialization file TS 910 which may represent the results of serializing the portion of the data structure indicated by oval 803, as it may be serialized by the serializing module 132. In some embodiments, the information from which the actual electronic content carrying nodes A through E 804 of FIG. 8 is reconstructible appears in FIG. 9 at 914. The serialization file TS 910 also includes information facilitating the reconstruction of the original (or equivalent) node-and-link search tree indicated by oval 803. In some embodiments, this information may take the form of an indication that the serialization file TS 910 is an ordered list to be deserialized and reconstructed in node-and-link form as a search tree. This reconstruction facilitation information is indicated at 912. FIG. 9 also diagrammatically illustrates the remaining portion of the data structure 802 after the portion indicated by oval 803 has been serialized and, in some embodiments, removed from the remaining internal data structure 902. The remaining internal data structure 902 includes the original top node (e.g., node 808) as well as a newly generated external link 908. This newly generated external link 908 may include serialization identification information 906 as well as, in some embodiments, other node-and-link reconstruction facilitation information 904. For example in the binary search tree data structure portion indicated by oval 803, the reconstruction facilitation data 904 may be used to indicate the particular binary search tree configuration to be used when reconstructing the binary search tree portion of the data structure from the serialization file TS 910.

In some embodiments, the information in file TS 910 from which the content carrying nodes of the binary search tree may be reconstructed may be expressed in a markup language, such as for example, XML.

Figure 10:
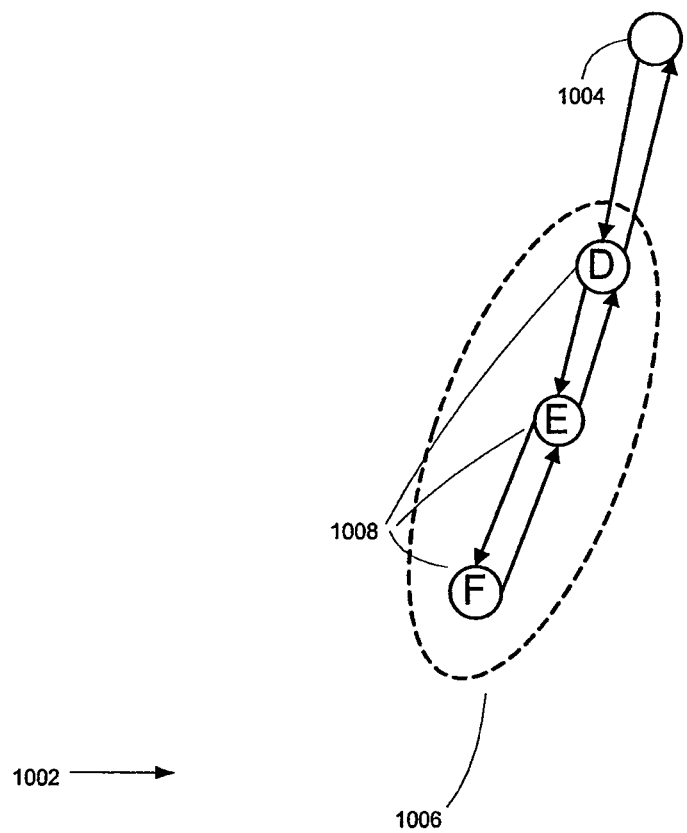
FIGS. 10, 11A and 11B are block diagrams illustrating a process for serializing a portion of a node-and-link data structure in the form of a linked list into a serialization in which the information from which the linked list node-and-link representation may be reconstructed, according to an example embodiment.
Figure 11A:
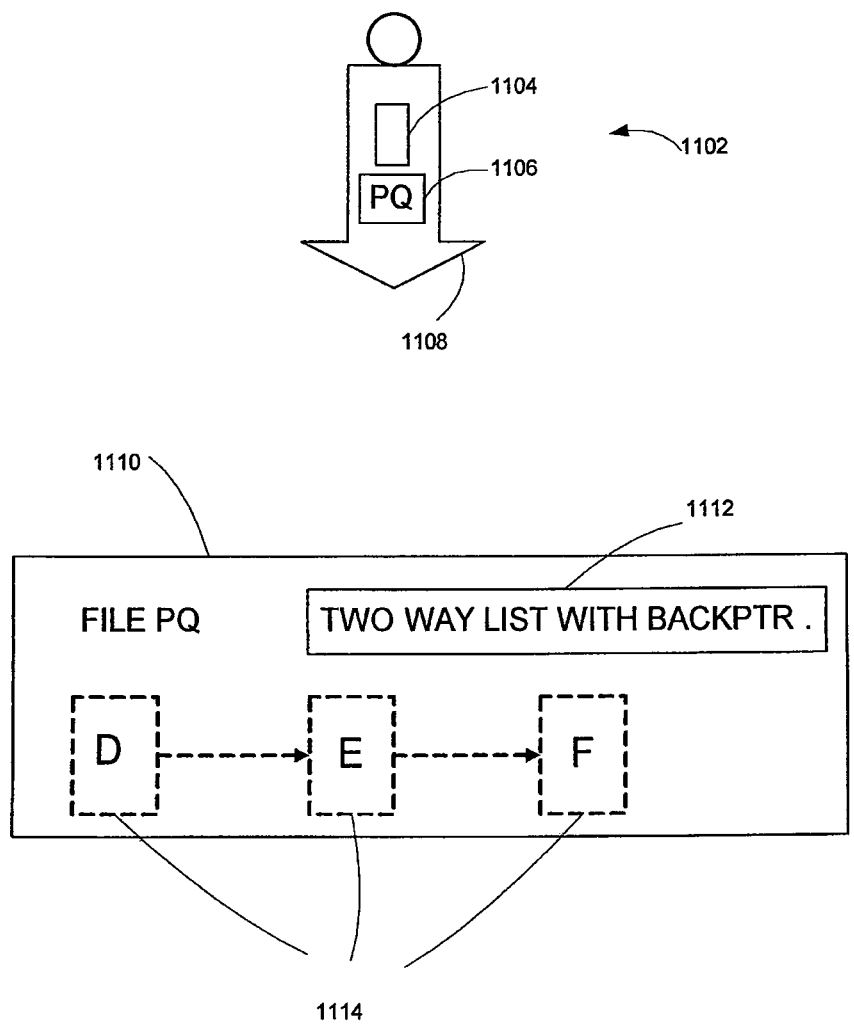
Figure 11B:
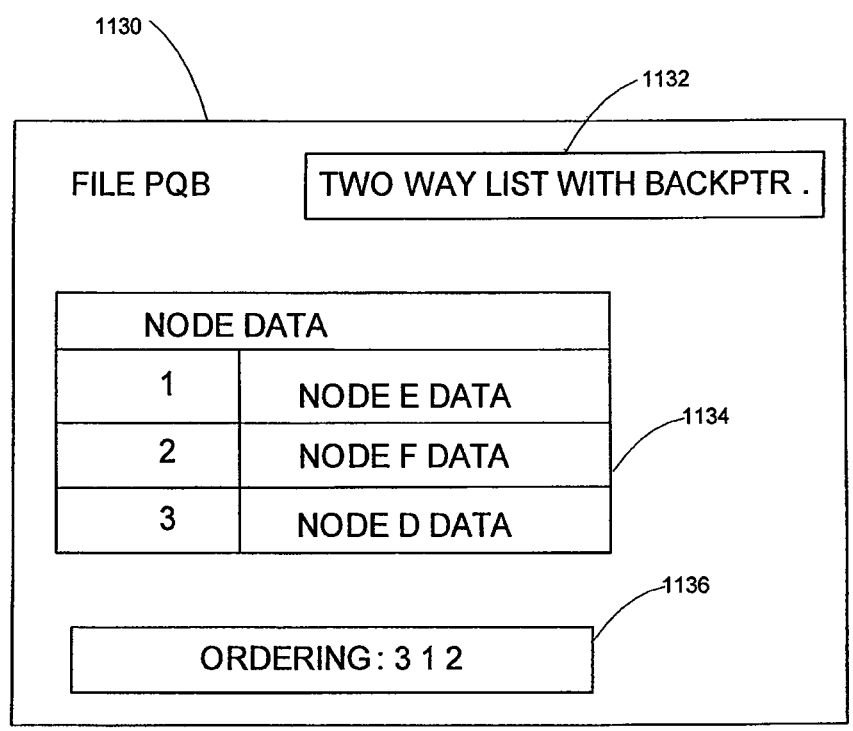

FIGS. 10, 11B, and 11B illustrate another example of a process in which a portion of a node-and-link data structure is serialized into a different representation from the original node-and-link representation, according to an example embodiment. In FIG. 10, an example data structure 1002 is illustrated in which a top node 1004 is connected using bidirectional inter-node links through a two-way linked list including the nodes 1008 labelled D, E and F. The doubly linked list itself is indicated by the oval 1006.

FIG. 11A illustrates an example serialization of the doubly linked list indicated by oval 1006 as it may be stored in a serialization file PQ 1110. The serialization file PQ 1110 may include information 1114 from which the nodes of the two-way linked list may be reconstructed as well as an indication of the order in the list of those reconstructed nodes suggested by the dashed arrows within the example serialization file PQ 1110. For example, the data contained in the nodes may be stored as within a list of markup language pairs ordered as they may be in a doubly-linked list reconstructible from the serialization file PQ 1110. In addition, the serialization file PQ 1110 includes reconstruction facilitation data 1112 serving to indicate that the serialization file PQ 1110 may be interpreted so as to facilitate the reconstruction from the information contained in the serialization file PQ 1110 into a two-way linked list that includes a back pointer to the node to which the list is attached. In the process of serializing the portion of the data structure indicated by oval 1006, the nodes D, E, and F may be removed, as well as the inter-node link from the top node 1004 to the node designated D. This inter-node link may be replaced by the external link 1108. External link 1108 may include a serialization identification data item 1106 as well as a reconstruction facilitation data 1104.

In the process of deserializing the serialization file PQ 1110, the external link may be replaced by a link to the reconstructed node A as well as the addition of a back pointer from the reconstructed A back to the top node. The deserialization process is discussed in detail below.

FIG. 1B illustrates an alternative example serialization of the doubly linked list indicated by oval 1006 as it may be stored in a serialization file PQB 1130. The serialization file PQB 1130 may include node data array 1134 from which the nodes of the two-way linked list may be reconstructed as well as an indication 1136 of the order in the list of those reconstructed nodes. In addition, the serialization file PQB 1130 includes reconstruction facilitation data 1132 serving to indicate that the serialization file PQB 1130 may be interpreted so as to facilitate the reconstruction from the information contained in the serialization file PQB 1130 into a two-way linked list that includes a back pointer to the node to which the list is attached.

Figure 12:
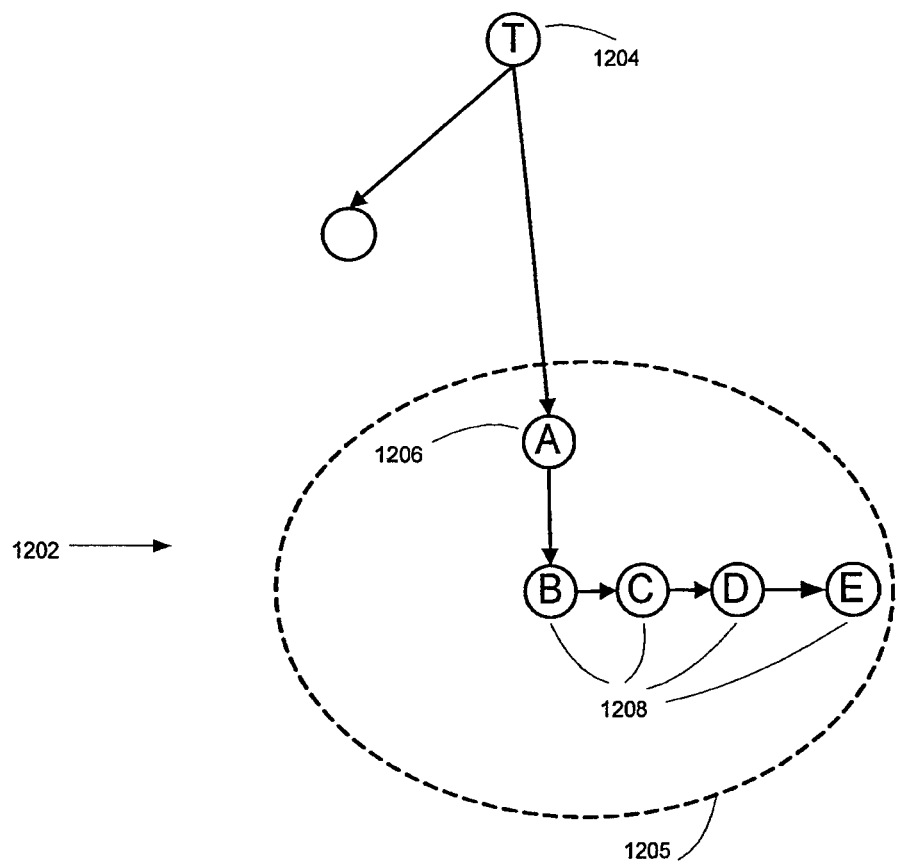
FIGS. 12 and 13 are flowcharts illustrating a method in which a portion of data structure structured as a linked list may be transformed into information in a tree-structured organization contained in a serialization, according to an example embodiment.
Figure 13:
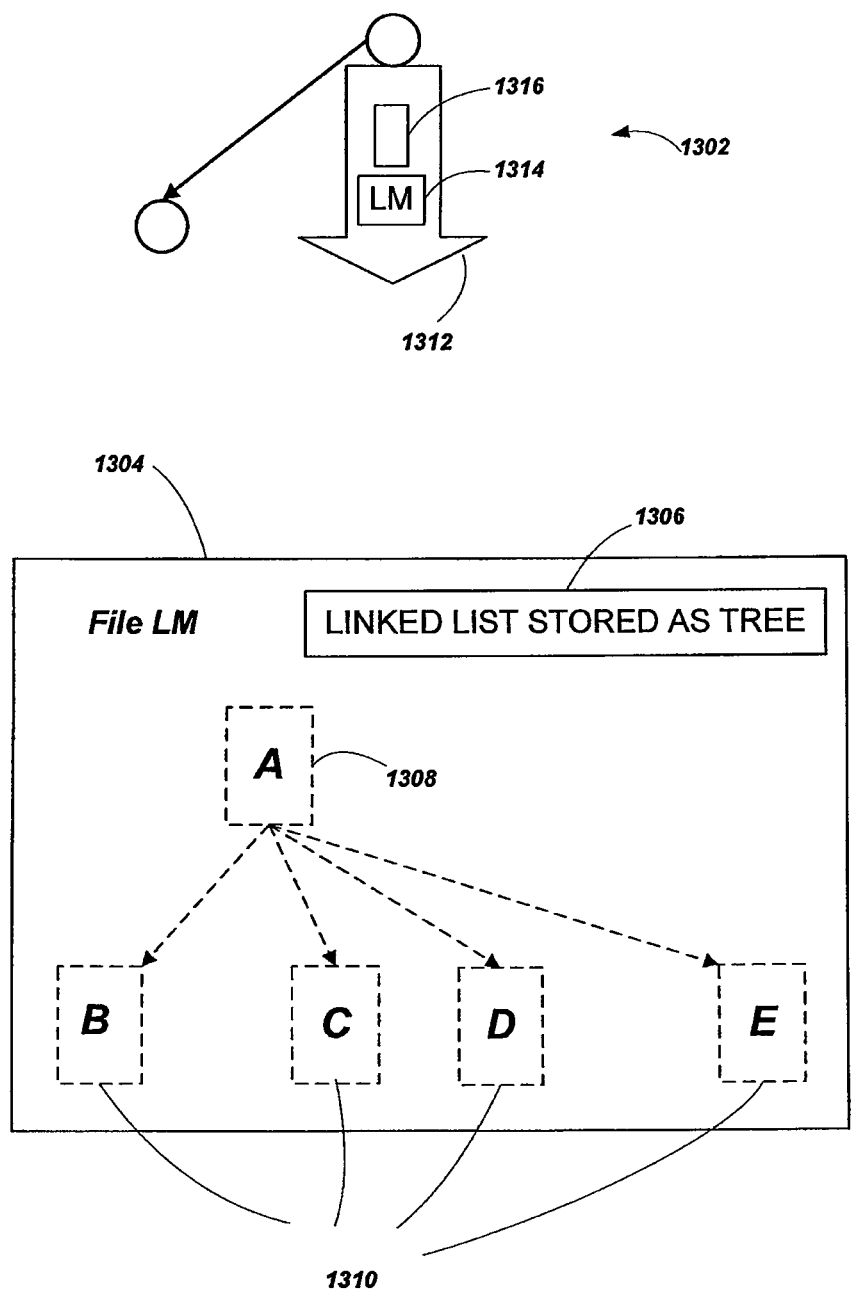

FIGS. 12 and 13 illustrate a process to serialise a portion of a node-and-link data structure in the form of a linked list into a serialization in which the information from which the linked list node-and-link representation may be reconstructed, according to an example embodiment.

FIG. 12 illustrates a data structure 1202 which may be used to store electronic content in a node-and-link representation. The data structure 1202 includes a top node T 1204 and a linked list portion indicated by the oval 1205. The linked list portion includes a list root node A 1206 and a series of linked list nodes B, C, D, E 1208. The portion of the data structure indicated by oval 1205 may be serialized into the serialization file LM 1304 of FIG. 13.

A serialization file LM 1304 is illustrated as containing information from which the list root node A 1206 and the four nodes of the linked list B, C, D, E 1208 may be reconstructed. This information is stored in the serialization file LM 1304 in the example form of tree structure in which information, from which the nodes B, C, D, E 1208 are reconstructable, is illustrated as information items 1310. The information items 1310 may be stored in a child-parent relationship with information item 1308.

The serialization file LM 1304 may also include information facilitating reconstruction of the portion of the electronic content in a linked list node-and-link representation such as that indicated by oval 1205. The reconstruction facilitation data 1306 in serialization file LM 1304 may be used to indicate that the information stored in serialization file 1304 is in the form of a linked list stored as a tree.

Once the portion of the data structure indicated by oval 1205 has been serialized into the serialization file LM 1304, in some embodiments by the serializing module 132, the list root node A 1206 and the linked list nodes 1208 may be removed from the data structure 1202 and the inter-node link from node T 1204 to node A 1206 may be replaced in the remaining part of the data structure 1302 by the external link 1312. The external link 1312 may include similar information as described with respect to previous figures.

It will be appreciated that the storage of the portion of electronic content in a node-and-link representation into a serialization may be implemented by the use of a markup language such as XML to represent either implicitly or explicitly the content of the nodes and the inter-node links among them. For example in the serialization file LM 1304, the file may include an opening XML tag containing the information describing or otherwise facilitating the reconstruction of list root node A 1206, followed by four XML tags including information describing or facilitating the reconstruction of the linked list nodes B, C, D,E 1208, followed by a closing markup language tag paired to the opening markup language tag that provides information for the reconstruction of the list root node A 1206.

In the preceding several examples, the node-and-link data structures have been illustrated as including only a single inter-node link by which the portion of the data structure to be serialized is connected to the remainder of the data structure that is not yet to be serialized. It will be appreciated that, in some embodiments, multiple inter-node links may exist between various nodes in the portion of the data structure to be serialized and various nodes in the portion of the data structure that is not yet to be serialized. For example, a content processing module 130 may identify a particular portion of a node-and-link data structure corresponding to a semantically-defined portion of the electronic content which may be storable into a single serialized file. It may further be the situation that a number of nodes in the particular portion of the data structure may be linked to one or more nodes in the portion of the data structure not being serialized into that file. In that case, multiple external links may be generated and associated with the nodes that are linked to nodes in the portion of the data structure to be stored in a serialization file.

Figure 14:
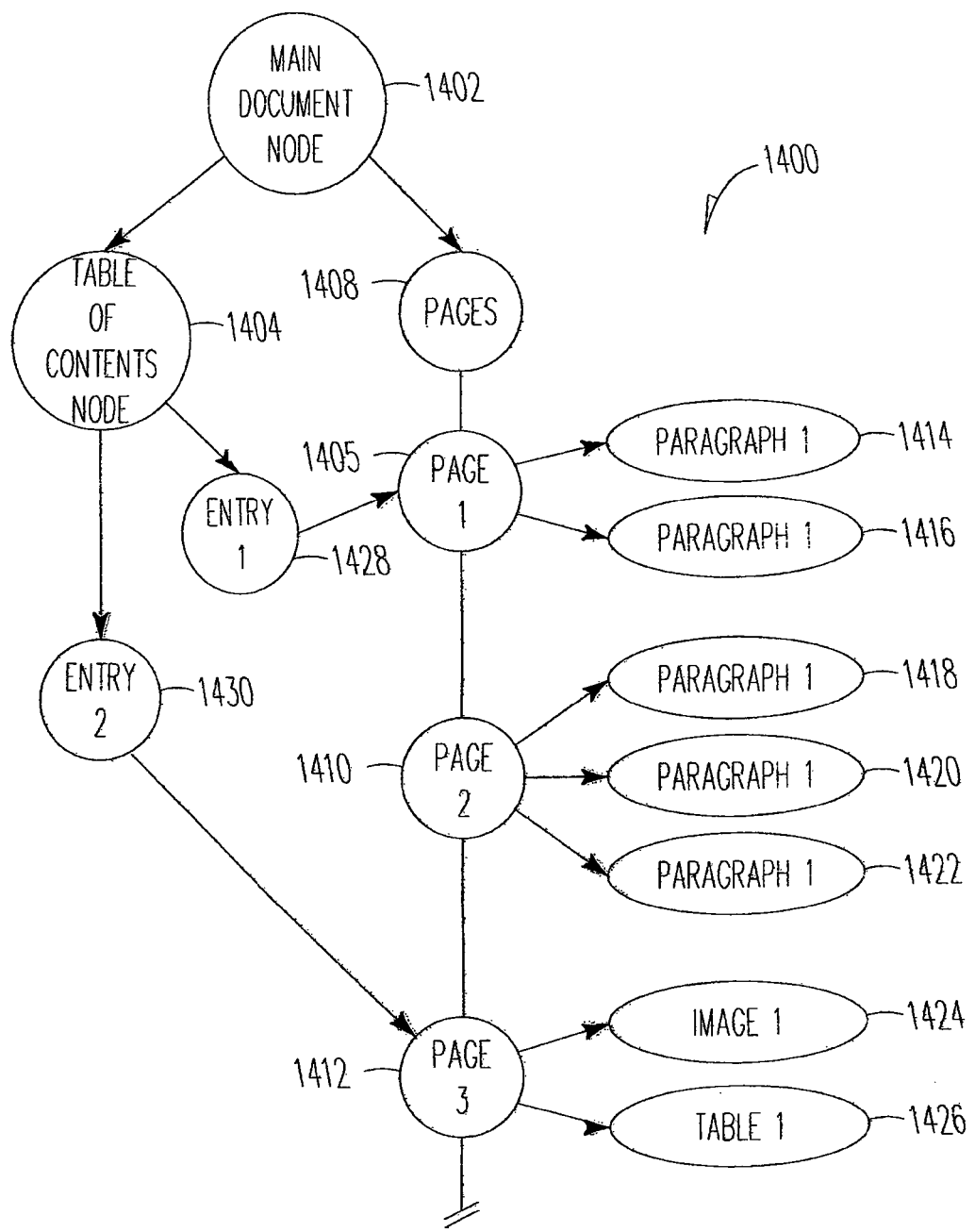
FIGS. 14 and 15 illustrate an example of serializing an electronic document stored in a node-and-link representation into a group or package of seven interrelated serialization files, according to an example embodiment.
Figure 15:
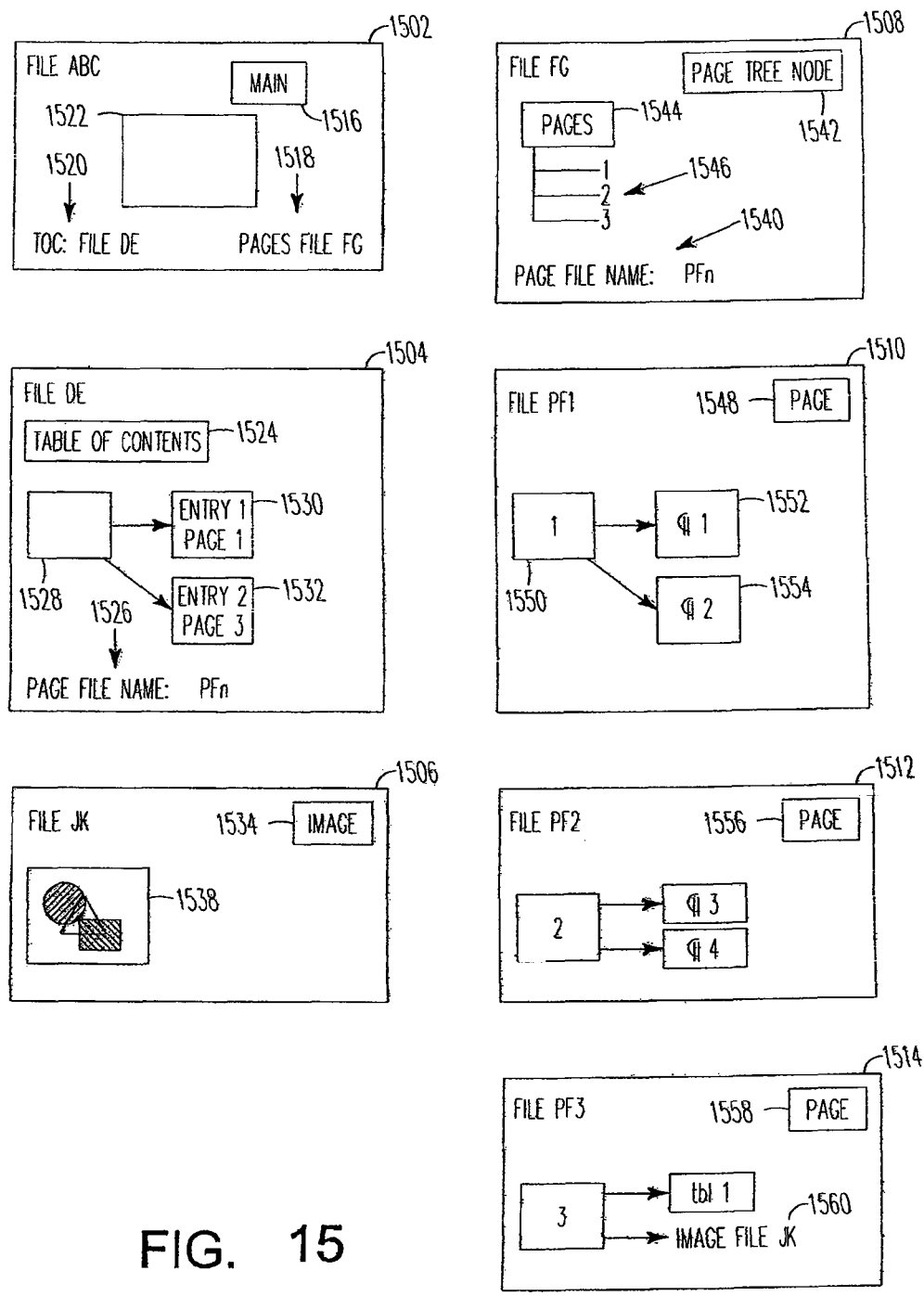

FIGS. 14 and 15 illustrate an example of serializing an electronic document stored in a node-and-link representation in a memory 102 by a content processing module 130 and a serializing module 132 into a group or package of seven interrelated serialization files, according to an example embodiment. The original node-and-link data structure 1400 representing an electronic document is illustrated in FIG. 14. The nodes depicted in FIG. 14 include a main document node 1402 that may serve as a root node for the node-and-link representation of the electronic document, and a number of nodes, 1408, 1410, and 1412 corresponding to pages of the electronic document. The page nodes 1408, 1410 and 1412 depend as a linked list from a page tree root node 1406. These page nodes 1408, 1410 and 1412 are connected by inter-node links to various nodes representing content elements associated with the pages. For example, page 1 of the electronic document includes two paragraphs and correspondingly the node-and-link representation of the electronic document includes a node 1414 which may include the text of first paragraph and node 1416 which may include the text of the second paragraph, both paragraph nodes attached to the page 1 node 1408 via inter-node links. Similarly, the page 2 node 1410 may include inter-node links to three paragraph nodes 1418, 1420 and 1422. Page 3 of the electronic document may include an image and a table. Thus, the page 3 node 1412 may have a incident inter-node links to an image node 1424 containing image information, and to a table node 1426 storing the table.

In addition to the page structure, the electronic document represented by the data structure 1400 may include a table of contents node 1404 corresponding to the electronic document's table of contents. The table of contents of the example electronic document may include two entries. A first entry node 1428, which may be used to allow a rendering of the electronic document to permit a user to navigate directly to a rendering of the first page of the document, and a second table of contents entry node 1430, which may allow the user when viewing a rendering of the electronic document to navigate directly to page 3.

FIG. 15 illustrates an example of how the electronic document stored in the node-and-link data structure 1400 may be serialized into seven serialization files, according to an example embodiment.

In FIG. 15 various serialization files—file ABC 1502, file DE 1504, file JK 1506, file FG 1508, file PF1 1510, file PF2 1512 and file PF3 1514—contain information allowing for the reconstruction of a portion of the node-and-link representation of the electronic document illustrated in FIG. 14. Each file in FIG. 15 may be considered to describe a semantically-defined portion of the electronic documents, the node-and-link representation of which is illustrated in FIG. 14.

The serialization file ABC 1502 includes information 1522 for reconstructing the main document node 1402, as well as information 1516 indicating that the file contains information facilitating the reconstruction of a main or root document node. The serialization file ABC 1502 also includes an indication 1520 of the table of contents top node as being reconstructible from the serialization file DE 1504, as well as an indication 1518 of the page tree root node constructible from the serialization file FG 1508.

The serialization file DE 1504 illustrates a serialization in which information describing a table of contents (which may be a semantically-defined portion of an electronic document) may be stored. Serialization file DE 1504, includes information 1528 facilitating reconstruction of the table of contents node 1404 itself, as well as information 1530 and 1532 allowing for the reconstruction of the table of contents entry nodes 1428 and 1430. It will be appreciated that the information facilitating reconstruction of the table of contents entry nodes is provided in terms of user-understandable page numbers rather than in a more abstract object identifier based scheme. The serialization file DE 1504 also includes information 1526 indicating the file name template (e.g., "PFn", where n is the page number) that may be used to identify the serialization files containing the information for reconstructing the page nodes 1408, 1410 and 1412.

Table 1 illustrates an example XML text that may be stored within, and implement the content of, serialization file DE 1504.

TABLE 1

```
<toc>
    <entry page="1">
    Introduction
    </entry>
    <entry page="3">
    Summary
    </entry>
    <filenames prefix="PF"/>
</toc>
```

It will be appreciated that the XML text of Table 1 does not closely resemble the corresponding portion of the data structure 1400. For example, the inter-node links that may be constructed between nodes 1404, 1428 and 1430 are not present, nor are external links or inter-node links connecting node 1405 to node 1428 or 1412 to 1430. However, in some embodiments, all of these links are constructible from the XML text of Table 1. Similarly, it will be appreciated that the table of contents entry identifiers (e.g., "ENTRY" "1", "2") found the data structure 1400 may be implicit in the XML text. Reconstruction facilitation data 1524 may, for example, be implemented via the <toc> tag pair.

The serialization file FG 1508 includes information facilitating reconstruction of the page tree root node 1406 and inter-node linkage to page nodes 1408, 1410 and 1412. The information 1544 which may facilitate the reconstruction of page tree root node 1406 as well as the information 1542 indicating that the serialization file FG 1508 relates to a page tree root node are illustrated as being included in serialization file FG 1508. In addition, the pages of the document are represented by page number information 1546. The serialization file FG 1508 also includes information 1540 to facilitate the identification of page node serialization file names, similar to that described above with respect to serialization file DE 1504. Two of the serialization files—PF1 1510 and PF2 1512—may include information (e.g., information 1550) for reconstructing a page node as well as information 1552 and 1554 which may contain the text of the paragraphs to be reconstructed into paragraph nodes (e.g., node 1414 and node 1416). Serialization file PF1 1510 and serialization file PF2 1512 may include information 1548 and 1556, respectively, indicating that the serialization contained in the files describes pages of an electronic document. Serialization file PF3 1514 from which page 3 node 1412 may be reconstructed is shown as having a different structure from the other two page serialization files illustrated; serialization file PF3 1514 includes a reference 1560 to an image file containing an image which is to be included in a rendering of the page corresponding to page 3 node 1412.

Table 2 illustrates an example XML text that may be stored within, and implement the content of, serialization file PF1 1510.

TABLE 2

```

<paragraph>
    Now is the time for all good men . . .
    </paragraph>
    <paragraph>
    It is now past the time for all good men . . .
    </paragraph>

```

Similarly to Table 1 above, Table 2 illustrates that an XML textual representation of nodes 1405, 1414, and 1416 may be serialized into a single serialization having a different structure than the corresponding portion of data structure 1400. For example, the inter-node links connecting node 1414 and node 1416 to node 1405 are absent in the XML representation, as is an explicit indication of page number or paragraph number. In some embodiments, during construction of a data structure from serialization files, the page number may be assigned based on data found in serialization file FG 1508 and paragraph numbers may be assigned based on the order of paragraphs found in serialization file PF 1 1510.

Serialization file JK 1506 may include data that facilitates the reconstruction of an image stored in an image node 1424 and included within the third page of the electronic document. Serialization file JK 1506 includes information 1534 indicating that the content of the serialization may be taken to represent an image. Serialization file JK 1506 is also shown as including the image data 1538 itself.

Example Processes For Reconstructing Node-and-link Data Structures From Serialization Files When an electronic document or other electronic content stored in a number of serialization files such as those illustrated in FIG. 15 is to be reconstructed in memory 102 in a node-and-link data structure, such as for example 1400, a main application 100 making use of a rendering module 106 may use deserialization module 126 to carry out the deserialization of one or more serialization files (e.g., 122 and 124 as shown in FIG. 1) to generate a data structure 112. In some embodiments, this process may be carried out in what may be termed a "lazy" manner, in which the entire data structure representing the electronic content in the node-and-link representation is not entirely reconstructed immediately but is rather reconstructed in stages as the rendering process, such as carried out by rendering module 106, traverses the node-and-link data structure (such as in the process of rendering the electronic content represented within the data structure). In some embodiments, this traversal may be accomplished by the use of the 'document object model'-type API 108.

In such lazy access node-and-link data structure construction processes, the main application may begin the process constructing a node-and-link data structure by requesting that a deserialization module access a package 120 or other mass storage directory structures to retrieve the serialization associated with the top or root node of the data structure to be reconstructed. This top node or other initial portion of the data structure may then be constructed from the serialization containing information facilitating the construction of that initial portion of the data structure. Once the initial portion of the data structure has been reconstructed from a serialization, the rendering module 106 may begin rendering (or otherwise processing) the electronic content such as an electronic document.

As the rendering module 106 begins to render the electronic document for which the initial portion of the data structure has been constructed, the rendering module 106 may occasionally attempt to reference a portion of the electronic content for which the corresponding portion of the data structure has not yet been constructed from a serialization. At that point the deserialization module 126, perhaps in response to an invocation by the rendering module 106, or perhaps through invocation by the 'document object model'-type API 108, may deserialize a serialization file describing the newly requested portion of the electronic content.

For example, by way of illustration, suppose that a user wished to view the electronic document stored in the seven serialization files illustrated in FIG. 15. At the beginning of the document rendering process, the rendering module 106 may determine that the initial portion of the data structure representing the electronic document to be rendered may be constructed from the serialization file ABC 1502. The rendering module 106 may request the deserialization module 126 to access serialization file ABC 1502 and construct the main document node 1402 with the references to the table of contents serialization file DE 1504 and to the pages serialization file FG 1508 being inserted into the data structure as external links. Next, suppose the rendering module 106 determined that it was necessary to render the table of contents into the rendering of the electronic document. In that case, the rendering module 106 may request the table of contents node be retrieved from memory 102, such as via the 'document object model'-type API 108. However, at this point in the construction of the node-and-link representation of the electronic document, a table of contents node would not yet be present in the data structure. However, an external link referencing the table of contents file, such as for example serialization file DE 1504, would be present and the information contained in the external link in conjunction with information in the table of contents node serialization file DE 1504 may be used to construct not only the table of contents node 1404, but also the table of contents entry nodes 1428 and 1430 with a table of contents entry node 1428 and 1430 including external links facilitating (in conjunction with the corresponding page serialization files) construction of, and connection to, page nodes 1408, 1410 and 1412.

Proceeding in this manner, the rendering module 106 in cooperation with the deserialization module 126 and the 'document object model'-type API 108, may construct an entire electronic document as a node-and-link data structure in memory 102 from the seven serialization files of FIG. 15. This construction may be carried out in operations in a lazy manner in which portions of the data structure containing several nodes are constructed from serializations as the information contained in those serializations to construct the nodes is required.

Figure 16:
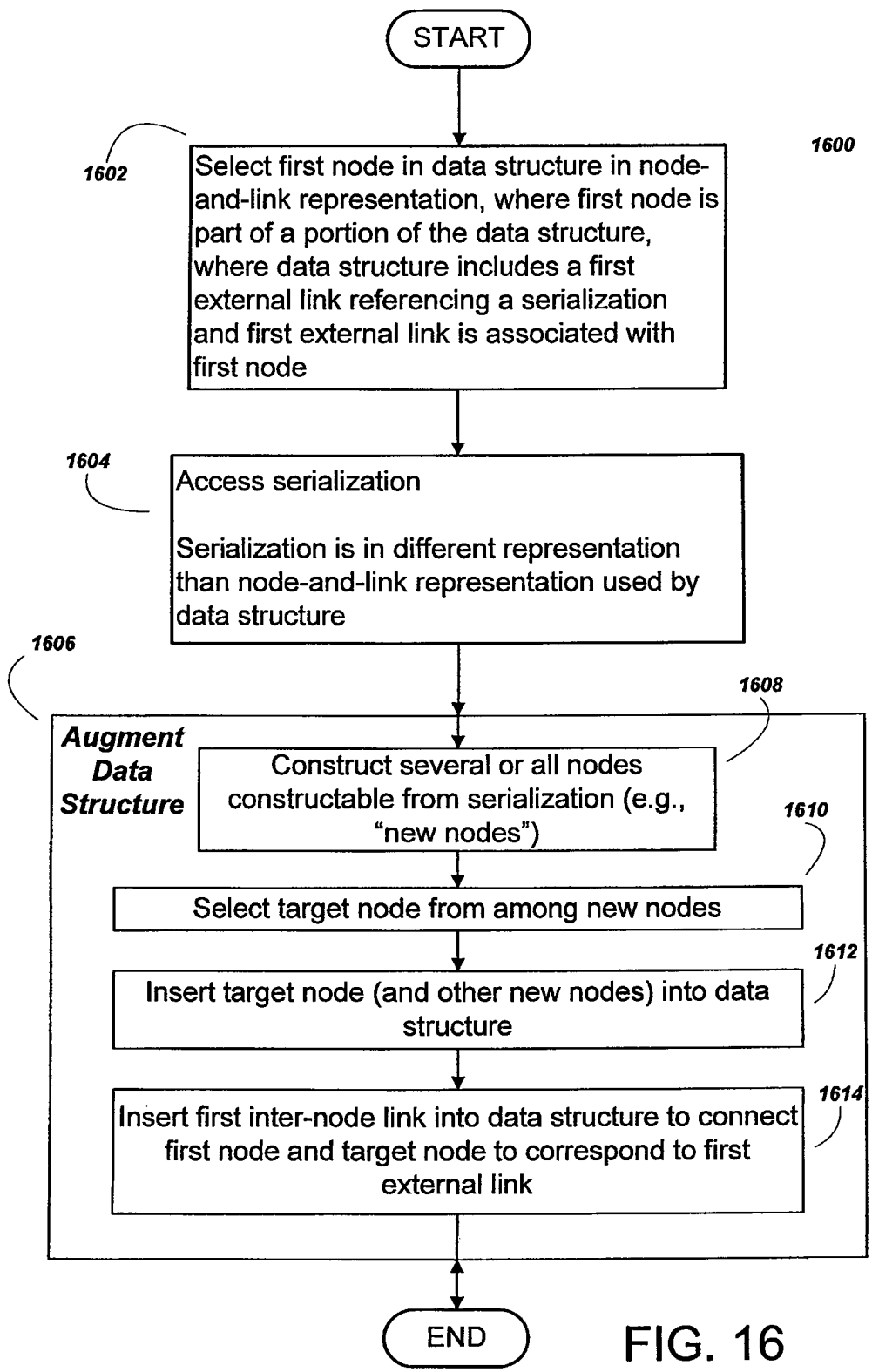
FIG. 16 is a flowchart illustrating in overview a process for deserializing a portion of electronic content, according to an example embodiment.

FIG. 16 shows a flowchart illustrating in overview a method 1600 for deserializing a portion of electronic content, according to an example embodiment.

At block 1602, a first node in a data structure in a node-and-link representation (in which the data structure represents electronic content) may be selected, where the data structure includes a first external link that references a serialization and the first external link is associated with or incident to the first node. In some embodiments, this selection may be carried out by rendering module 106. In some embodiments, as facilitated by the 'document object model'-type API 108, the first node may be a node that is in memory, but has an external link incident to it. The external link may reference a serialization, from which a node requested by the rendering module 106, may be constructed. In other words, the rendering module 106 or other component of the main application 100 may be requesting access to a particular node (e.g., for the purpose of processing or rendering) that the rendering module 106 expects is a part of data structure 112, but which in fact was not yet reconstructed from a serialization file.

For example, the rendering module 106 may be processing a particular node (e.g., the 'first node' mentioned in block 1602 which may be termed 'node A' for purposes of discussion), and may need to access an expected node B that the rendering module 106 expects to be connected by an inter-node link to node A. Thus, the process of constructing node B from a serialization, node A may be selected by the rendering module 106 in the sense of being selected by the rendering module 106 as the node A from which a particular child node B is expected to be joined to by an inter-node link. However, when a child node B requested by a rendering module 106, is in fact not present in data structure 112, but is constructable from a serialization, an external link may be associated with node A.

At block 1604, a serialization that is referenced by the external link is accessed, in some embodiments, by the deserialization module 126. At block 1606, the data structure 112 in memory 102 may be augmented, which may be carried out by the deserialization module 126. As part of the augmenting of the data structure, at block 1608 the deserialization module 126 may construct several, or in some embodiments, all of the nodes that are constructible from the serialization referenced by the external link.

At 1610, a target node may be selected from among the new nodes. This target node is the child node (e.g., node B in the above discussion) of the first node (e.g., node A in the above discussion) and may be the node which the rendering module 106 needs to access to continue the rendering process of the electronic content represented by the data structure 112. At block 1612 the target node may be inserted into the data structure 112, along with the other new nodes constructed at block 1608.

At block 1614, an inter-node link may be inserted into the data structure connecting the first node and the target node. This inter-node link may correspond to, and in some embodiments, may replace the external link. The target node has at this point in the method 1600 been inserted into the data structure, along with an inter-node link from the first node allows this target node to be retrieved or accessed from the data structure 112 by the rendering module 106. Accordingly, the rendering module 106 is able to continue the rendering process using electronic content included in the target node and in other new nodes added to the data structure 112 at block 1612.

Figure 17:
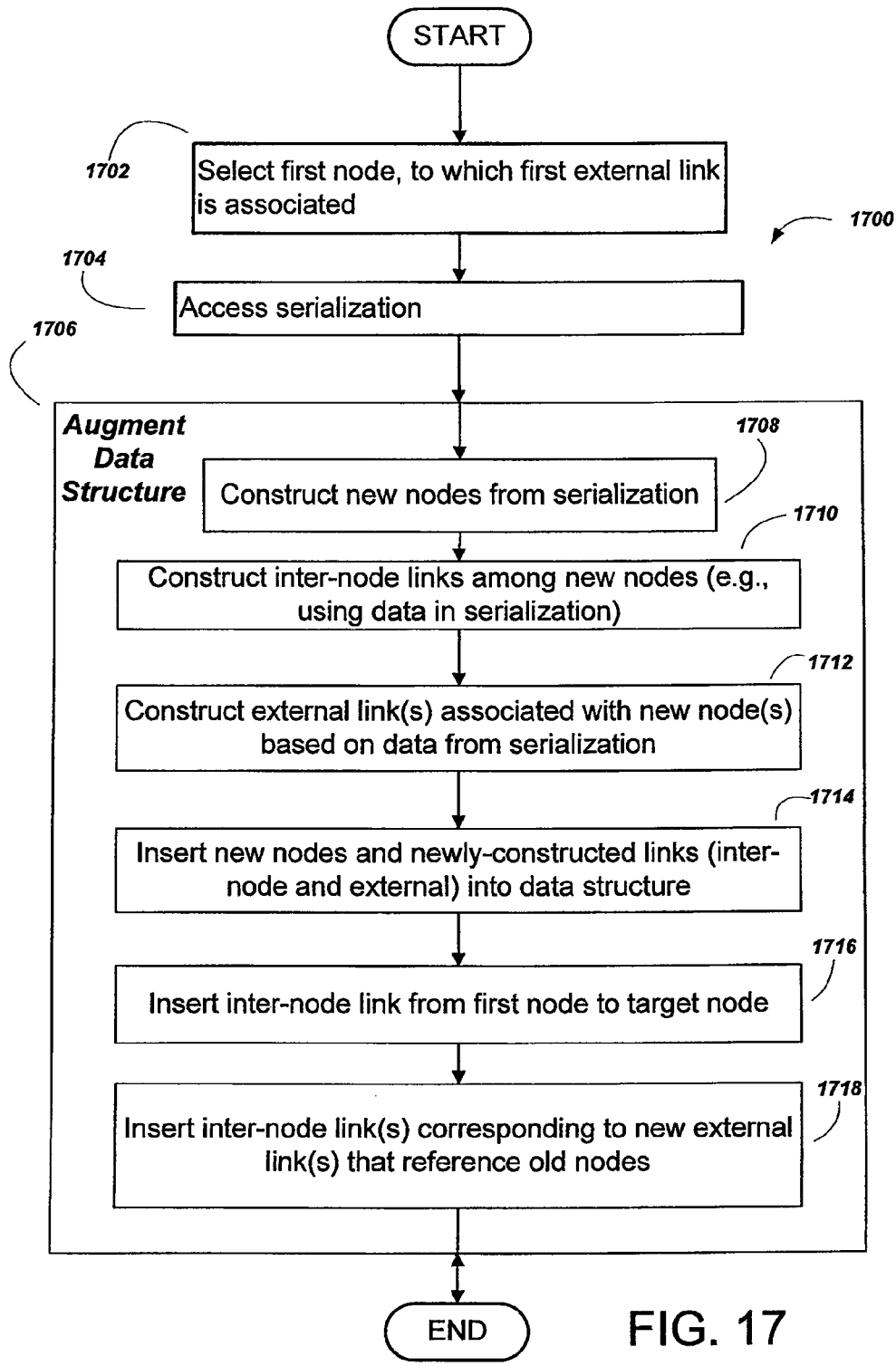
FIG. 17 is a further flowchart illustrating certain details of a process for deserializing a portion of electronic content, according to an example embodiment.

FIG. 17 shows a further flowchart illustrating certain details in a method 1700 to deserialize a portion of electronic content, according to an example embodiment. As in the method 1600, the method 1700 begins with the selection at block 1702 of a first node to which a first external link is associated. This first node may be the parent node (e.g., node A of the above discussion) of a node (e.g., node B of the above discussion) that is not present in data structure (e.g., 112) but which the rendering module 106 needs to access and which may be constructible from a file indicated by the first external link. (Note to self: discuss first node in context of later examples.)

At block 1704, the serialization referenced by the first external link may be accessed by the deserialization module

126. At block 1706, the data structure may be augmented, a process that may be also carried out by the deserialization module 126. The process of augmenting the data structure illustrated in block 1706 includes several operations. At block 1708 the new nodes constructible from the serialization may be constructed, in some embodiments, by deserialization module 126. At 1710, inter-node links among the new nodes may be constructed based on, for example, information in the serialization. At 1712, any external links associated with the new nodes may be constructed. These new external links associated with the new nodes may be constructed from the information in the serialization and may reference other serializations that have not yet been deserialized, or may reference serializations from which nodes have already been constructed and added to the data structure.

At 1714 the newly constructed nodes, which may be termed new nodes and the newly reconstructed links (both inter-node links constructed at block 1710 and external links constructed at block 1712), may be inserted into the data structure. At block 1716, an inter-node link may be inserted into the data structure that links from the first node to the newly constructed target node.

At block 1718, inter-node links may be added to the data structure that corresponded to external links constructible from the serialization that reference nodes in the data structure that had already been constructed prior to the execution of method 1700 (e.g., "back-pointing external links"). These back-pointing external links, so called since they are incident to newly-constructed nodes and reference serializations from which nodes earlier constructed and residing in the data structure prior to the execution of the method 1700, may be replaced by corresponding back-pointing inter-node links. The identification of the earlier-constructed nodes to which a back-pointing inter-node link are to reference may be made based on the nature of the newly-added node to which they are to be incident and information in the back-pointing external link and may be facilitated by node lookup table 128, whose function is discussed in detail below.

In some embodiments, the augmenting of the data structure at block 1706 based on the information contained in the serialization, and in some embodiments, in the first external link present in the data structure before the execution of method 1700, may include other processing. For example, there may be multiple external links (incident to existing nodes) exist in the data structure before the processing shown in method 1700 that indicate that the target node should be connected to those existing nodes by an inter-node link. If that is the case, those external links may be removed from the data structure and replaced with inter-node links to link the existing nodes to the newly-constructed target node. Similarly, if a serialization includes information indicating that a node newly constructed from the serialization should be connected to an already-existing node via an inter-node link, the existing link may be connected to the newly constructed node.

Node-and-link Electronic Content Representation Reconstruction Examples

In the sections that follow, an example of a process for constructing a data structure representing electronic content in a node-and-link representation is described. The following example illustrations, FIGS. 18 through 25, illustrate how the method 1600 and/or method 1700 may be used in a process to construct a data structure 112 in memory 102 from a set of serializations, such as for example serialization file 122 and serialization file 124, which may be contained in a package 120, such as for example a directory hierarchy, compressed-directory file, e.g., a ZIP file, according to an example embodiment.

Figure 18:
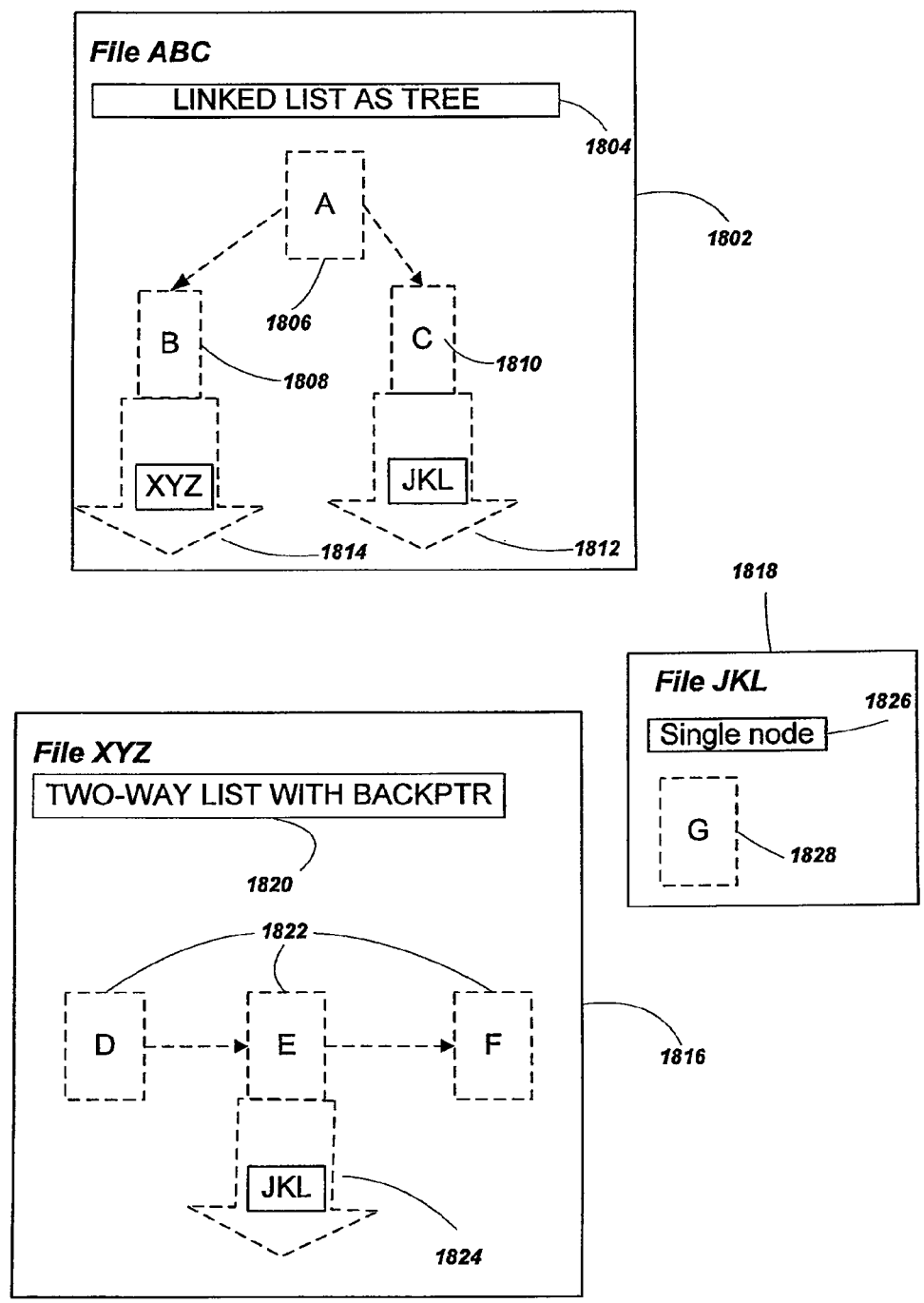
FIGS. 18-25, illustrate how the process of FIG. 16 and/or the process of FIG. 17 may be used in a process to construct a node-and-link data structure from a set of serializations, according to an example embodiment.

FIG. 18 illustrates three serializations in the form of three serialization files, file ABC 1802, serialization file XYZ 1816 and serialization file JKL 1818. File ABC includes information for constructing three nodes. This information includes the information 1806 for constructing node A, 1808 for node B 1808 and 1810 for node C. The serialization file ABC 1802 is shown as also including information 1804 indicating that the node-describing information is to be used to reconstruct the linked list whose first (e.g., list root) node is A followed by nodes B and C, even though the information describing nodes A, B and C in serialization file ABC 1802 is, for purposes of this example, organized in the form of a tree. Within serialization file ABC 1802 are also included information 1814 and information 1812 describing external links associated with nodes B and C, which may be constructed when serialization file ABC 1802 is deserialized. Although not indicated in the illustration in FIG. 18, serialization file ABC 1802, may in this example be taken to be the first or initial serialization to be deserialized in the process of constructing a full node-and-link representation of the electronic content stored in the three serialization files of FIG. 18. Example serialization file ABC 1802 includes information 1814 which may be used to reconstruct an external link that references serialization file XYZ 1816 and information 1812 which may be used to reconstruct an external link that references serialization file JKL 1818, from which nodes to be connected to nodes B and C, respectively, may be constructed.

Serialization file XYZ 1816 includes information designated collectively as 1822 facilitating constructing three nodes. Serialization file XYZ 1816 also includes external link information 1824 that may be used to generate an external link incident to a node E constructible from serialization file XYZ 1816. Serialization file XYZ 1816 further includes information 1820 indicating that the three nodes are to be constructed into a two-way list and to include a back pointer from the first reconstructed node to the node to which it is linked.

Serialization file JKL 1818 includes information 1828 facilitating constructing a single node (e.g., node G) as well as information 1826 indicating that the serialization file JKL 1818 includes only a single node.

FIGS. 19 through 25 discuss how the processes illustrated in FIGS. 16 and 17 may be used in the process of constructing a node-and-link representation of the electronic content stored in the three example serialization files of FIG. 18.

Figure 19:
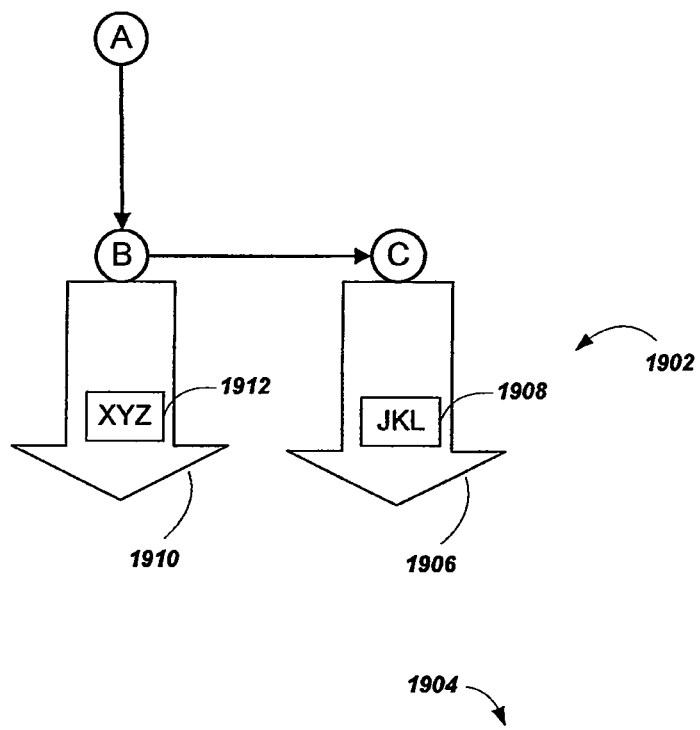

FIG. 19 illustrates an initial data structure 1902 which may be constructed by deserialization module 126 from the serialization file ABC 1802. It will be appreciated that the tree-like representation of the node information shown in serialization file ABC 1802 has been constructed into, for example, memory 102, as a linked list structure having a linked list root node A and a linked list of nodes B and C. In addition, information 1814 and 1812 in serialization file ABC 1802 has been used to construct two external links 1910 and 1906. The external links 1906 and 1910 may include information (1912 and 1908, respectively) identifying the files that contain information facilitating reconstruction of the nodes which are to be connected to nodes B and C via inter-node links. It will be appreciated that only one node is constructible from serialization file JKL 1818 and a distinguished node, namely node D, is constructible from serialization file XYZ 1816.

In the process of constructing the initial data structure 1902, in some embodiments a deserialization module 126 may maintain a node lookup table 128 within memory 102. This node lookup table may be used to map from descriptive data (e.g., names or other data having conceptual or human-understandable meaning, such as "page 2", "first paragraph")

to symbolic data (such as memory addresses, pointers, object references, symbolic node names, or the like) identifying node objects. For example, a first serialization may include information to facilitate reconstructing a particular node which may be termed node N1. Node N1 may contain information describing a particular page of an electronic document, and when constructed from a serialization and stored into memory may, for example, be stored at location 0xAF01C1999D3 in memory. On the other hand, information in serializations describing other nodes to be linked to node N1, may refer to node N1 as "page 7". In this example, node lookup table 128 may include an entry mapping the conceptual identification or description "page 7" to the node object stored at location 0xAF01C1999D3. Thus, in the process of constructing nodes from information in serializations that refer to "page 7" as a related node, an inter-node link (e.g., to replace an external link stored in the data structure incident to a node being rendered) connecting those later-constructed nodes to the earlier-constructed node N1 may, for example, be generated by looking up the memory location in the node lookup table 128.

Suppose, for the purpose of illustration, that in FIG. 19 the node designated A is the root of an electronic document and that the nodes designated B and C are page 1 and page 2 of that electronic document. Thus, descriptive information for the nodes B and C may be used to look up the identification of those nodes in the table 1904, illustrating in this example the node lookup table 128. As more nodes are added to the initial data structure 1902, such as by the deserialization module 126, the table 1904 may expand.

Figure 20:
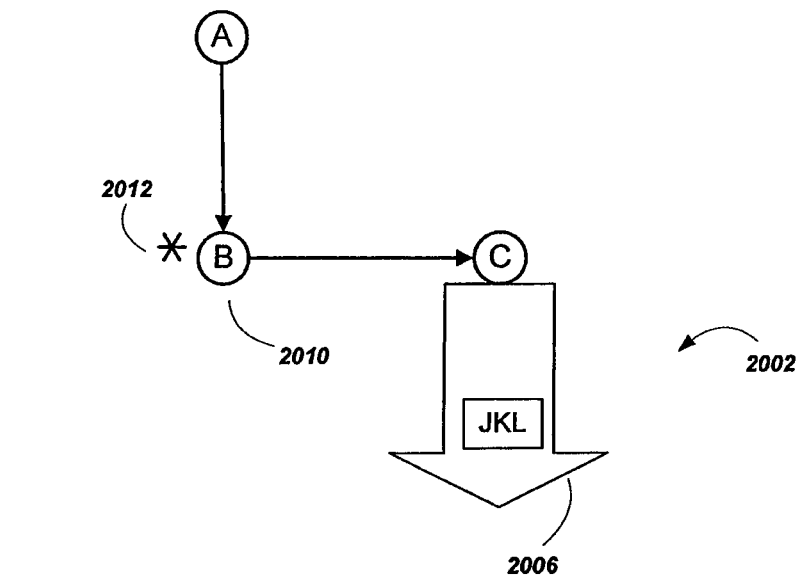
Figure 20:
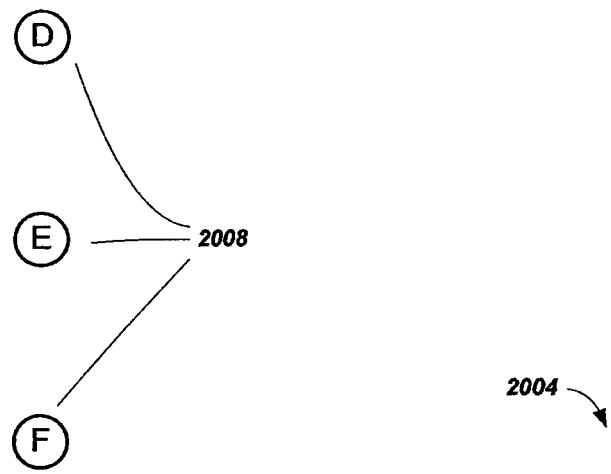

FIG. 20 illustrates a further operation in the process of constructing a node-and-link data structure based on the electronic content stored in the serialization files of FIG. 18, according to an example embodiment. In FIG. 20, for purposes of illustration, suppose that the rendering of the electronic content which may be an electronic document has proceeded to the point of rendering page 1 data for which is stored in the node 2010, symbolically identified as node B. Suppose for purposes of illustration that the rendering module 106 was in the process of rendering the content at node 2010, such as a page of an electronic document. The fact that the rendering module 106 was in the process of rendering or otherwise processing the node 2010 is indicated by the star-shaped glyph 2012 adjacent to the node 2010. In the process of rendering the content of the node 2010, the rendering module 106 may try (for example, by using the 'document object model'-type API 108) to access nodes expected to be connected to node 2010, which may, for example, include the content elements to be included in the rendering of the page represented by node 2010. In some embodiments, the 'document object model'-type API 108 may determine that the requested node representing the first content element included in the page is not yet in the data structure 2002, but that the external link 1910 shown in FIG. 19 indicates a serialization file XYZ 1816 from which the page content element-containing nodes may be constructed. In that case, the 'document object model'-type API 108 may cause the deserialization module 126 to deserialize the needed serialization to insert the needed node (as well as other nodes constructible from that serialization) and links into the data structure. In some embodiments, the document object module type API 108, upon receiving a request from the rendering module 106 for a particular node such as a content element in a particular page that has not yet been constructed and stored in the data structure 2002, may return the external link to the rendering module 106. The rendering module 106 may then cause deserialization module 126 to attempt to construct and insert the needed nodes and inter-node links into the data structure 2002. Finally, in either variation of the process, the rendering module 106 may continue the rendering of the electronic document once nodes and links that include the needed content elements have been constructed and inserted into the data structure.

In FIG. 20, it will be observed that external link 1910 has been removed from the portion of the data structure 2002 thus far constructed and that three new nodes labelled D, E and F 2008 have been constructed from the information 1822 from serialization file XYZ 1816. The identification of these new nodes represented here by the D, E and F labels have been added along with the descriptions of the three new nodes to the table 128 maintained by the deserialization module 126 that is shown in its newly expanded state as table 2004.

Figure 21:
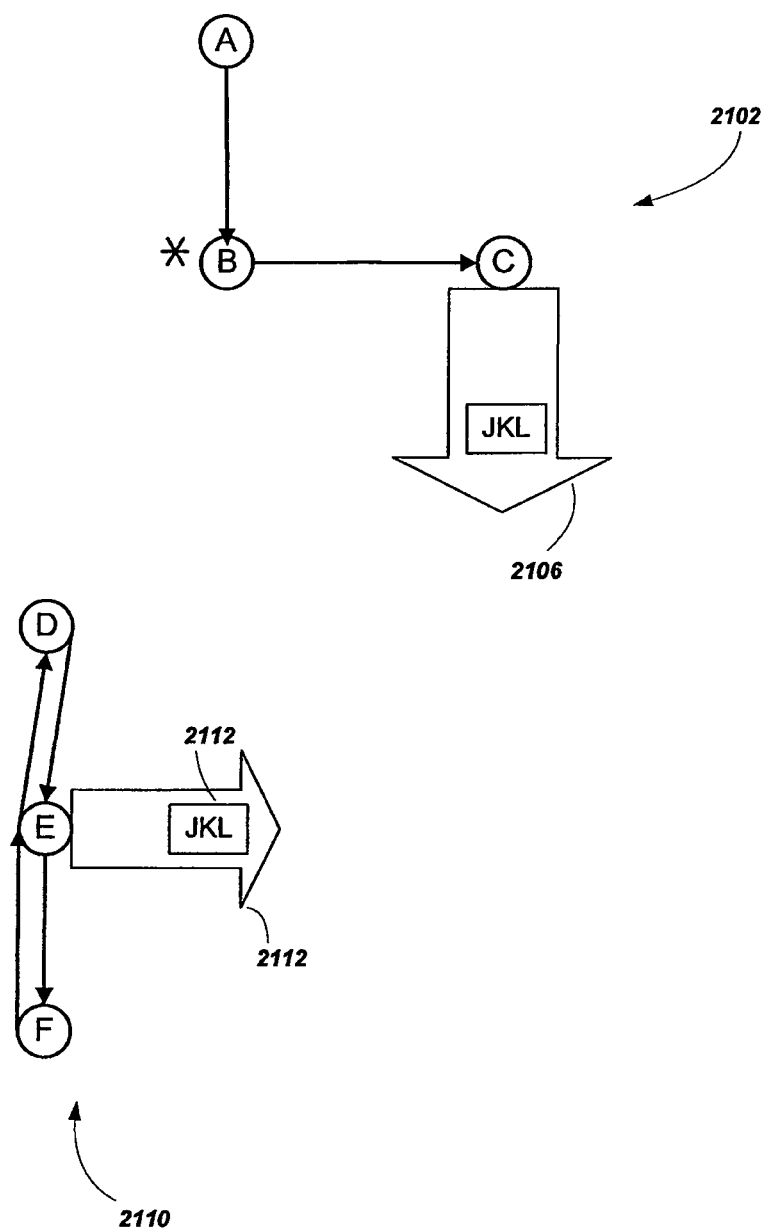

FIG. 21 illustrates the continuation of the diagrammatic example that began with FIG. 18. At FIG. 21 the initial data structure 2102 which may represent the initial part of an electronic content in the node-and-link representation is illustrated. The three new nodes identified as nodes D, E and F of this example are also shown as part of fragment 2110; the new nodes D, E and F, having been constructed from information 1822 in serialization file XYZ 1816, have been connected by inter-node links according to the information 1820 indicating that the nodes constructible from the serialization file XYZ 1816 are to be treated as a two-way linked list. In addition, an external link 2112 whose construction was facilitated by external link information 1824 has been made incident to node E.

Figure 22:
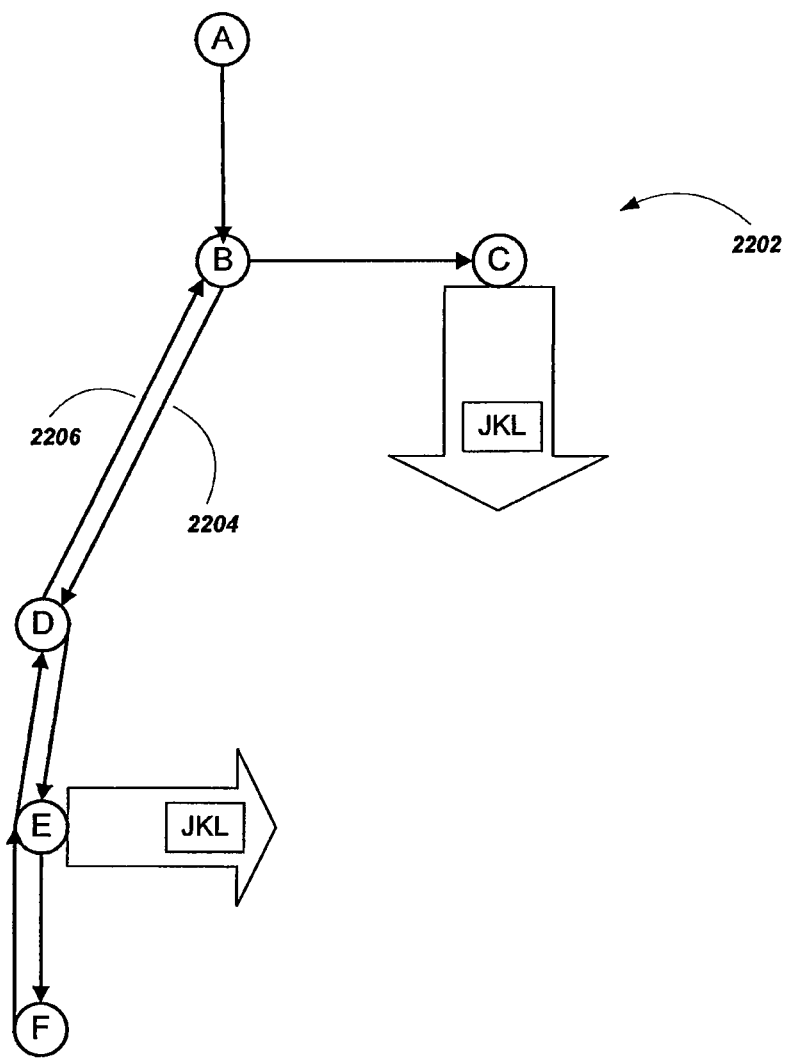

FIG. 22 illustrates the next operation of the construction process for the data structure representing the electronic content in a node-and-link representation that is shown in the three serialization files of FIG. 18, according to an example embodiment. In FIG. 22, two new inter-node links—inter-node link 2206, the inter-node link corresponding to the previous external link 1910 incident to node B, and back pointing inter-node link 2204 from newly constructed node D to node B—have been generated so as to form data structure 2202 by connecting data structure 2102 and fragment 2110.

The data structure having been thus augmented with the nodes D, E and F and their associated inter-node and external links, the processing or rendering of the electronic content may continue, the content elements stored or associated with nodes D, E and F at this point being available to the rendering module 106.

The external links within a data structure (such as 2202) may be resolved and replaced with inter-node links as the nodes and links constructible from the serializations to which they point are needed (by e.g., rendering module 106) in a lazy type process. In some embodiments, the deserialization module 126, in determining that a serialization file just deserialized includes information describing one or more external links, may immediately attempt to deserialize the serialization files identified by those external links. This deserialization may include attaching the newly constructed nodes and inter-node links to the data structure recursively. This may have the effect that the entire node-and-link representation of the electronic content stored in one or more serializations is deserialized in a single deserialization process prior to electronic content processing or rendering.

Figure 23:
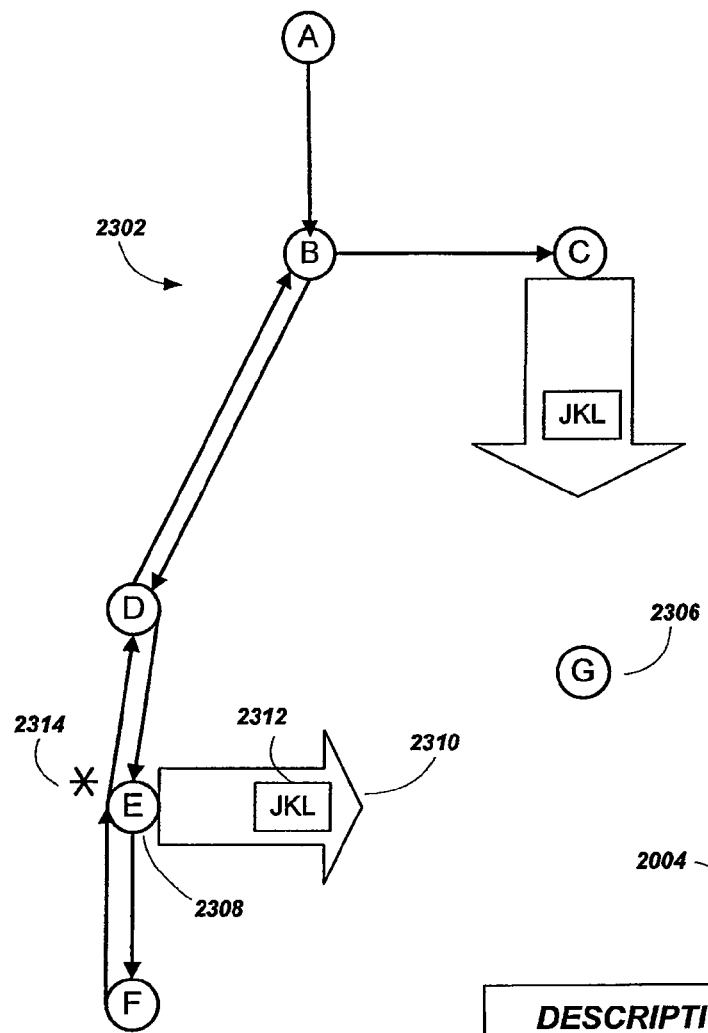

FIG. 23 illustrates a next operation in the deserialization process of the electronic content stored in the three serialization files of FIG. 18, according to an example embodiment. In FIG. 23, for purposes of illustration, the rendering module 106 may at this point be processing node E 2308 as indicated by the star glyph 2314 and in so doing, need to access a child node of node 2308 providing, for example, an image. In response, the deserialization module 126 may access the serialization file JKL 1818 as referenced by the external link 2310 containing file identification data 2312. The deserialization module 126 may then construct the node G 2306 from the information 1828 in serialization file JKL 1818. The deserialization module 126 may also enter the description to node identification entry into the node lookup table 128 which in its yet further expanded form is illustrated at 2304.

Figure 24:
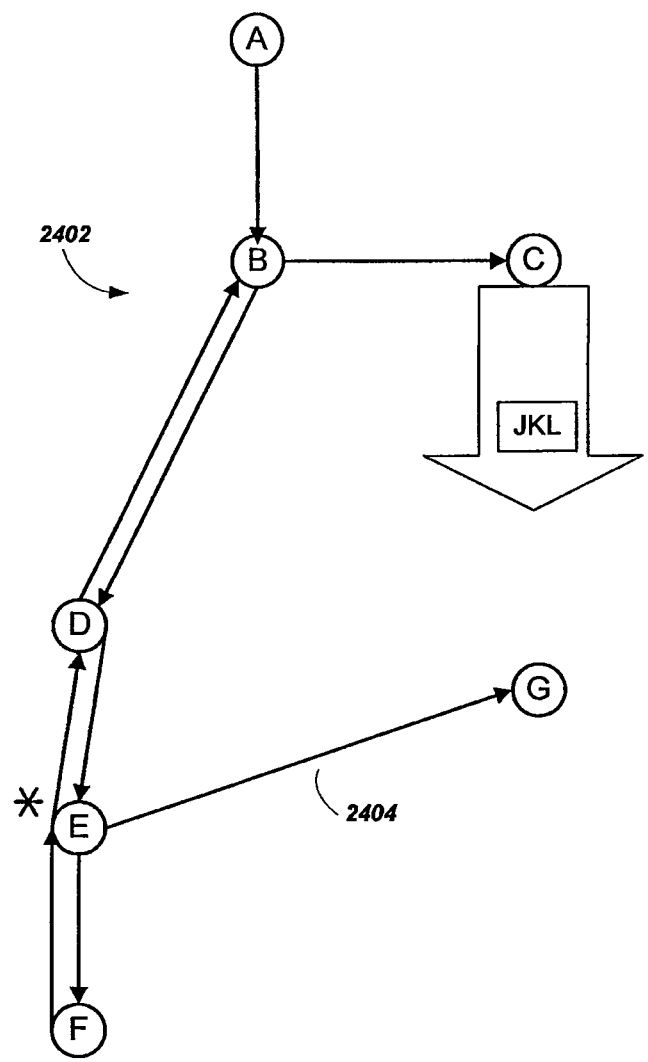

FIG. 24 shows the next operation in the process in which the node G is connected by an inter-node link to node E.

Figure 25:
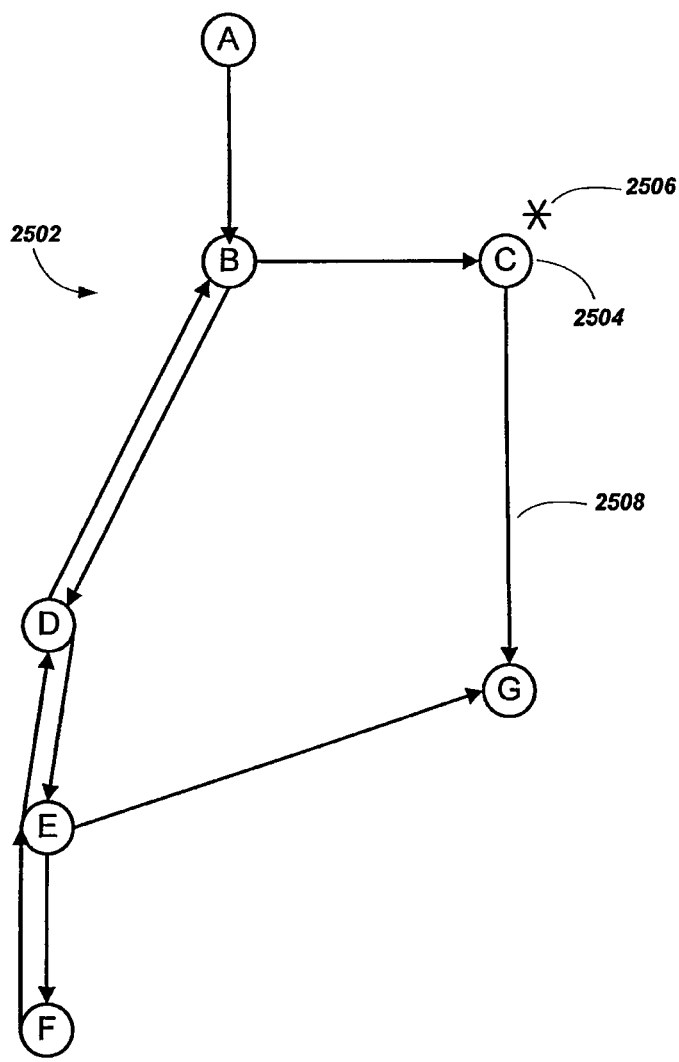

Finally, in FIG. 25 the processing or rendering of the data structure 2502 has proceeded to the point where node C 2504 is to have its child node processed. It will be observed that in the previous FIG. 24 that node C has an external link indicating that its child node is constructible from the serialization file JKL 1818. In addition, the external link may indicate that the node to be constructed from serialization file JKL 1818 is an image. At this point in the process of constructing the data structure 2502, the deserialization module 126 may simply be able to look up the description "JKL image" in the table 2304 and determine that the node of interest has already been constructed and inserted into the data structure and that the external link 2402 may be removed and simply replaced by an inter-node link 2508, thus allowing the processing to continue including processing node G as a child node of node C 2504 within the node-and-link data structure 2502.

At this point, the node-and-link representation of the electronic content stored in the three serialization files of FIG. 18 may be considered complete.

Computer Systems for Carrying Out Example Processes

Figure 26:
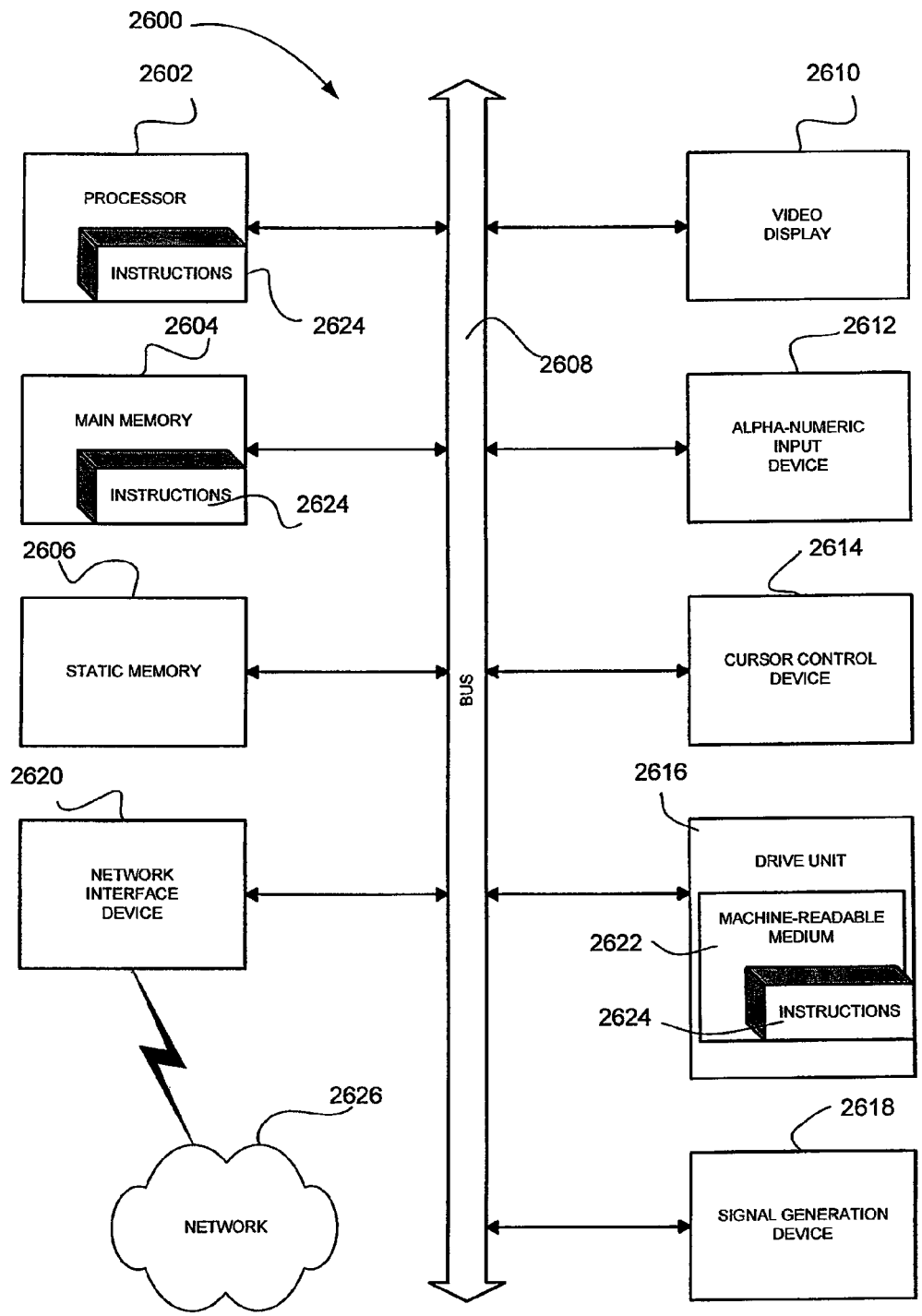
FIG. 26 shows a diagrammatic representation of machine in the example form of a computer system within which a set of instructions, for causing the machine to perform any one or more of the methodologies discussed herein, may be executed.

FIG. 26 shows a diagrammatic representation of machine in the example form of a computer system 2600 within which a set of instructions, for causing the machine to perform any one or more of the methodologies, methods, processes, or procedures discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 2600 includes a processor 2602 (e.g., a central processing unit (CPU), a graphics processing unit (GPU) or both), a main memory 2604 and a static memory 2606, which communicate with each other via a bus 2608. The computer system 2600 may further include a video display unit 2610 (e.g., a liquid crystal display (LCD) or a cathode ray tube (CRT)). The computer system 2600 also includes an alphanumeric input device 2612 (e.g., a keyboard), a user interface (UI) navigation device 2614 (e.g., a mouse), a disk drive unit 2616, a signal generation device 2618 (e.g., a speaker) and a network interface device 2620.

The disk drive unit 2616 includes a machine-readable medium 2622 on which is stored one or more sets of instructions and data structures (e.g., software 2624) embodying or utilized by any one or more of the methodologies or functions described herein. The software 2624 may also reside, completely or at least partially, within the main memory 2604 and/or within the processor 2602 during execution thereof by the computer system 2600, the main memory 2604 and the processor 2602 also constituting machine-readable media.

The software 2624 may further be transmitted or received over a network 2626 via the network interface device 2620 utilizing any one of a number of well-known transfer protocols (e.g., HTTP).

While the machine-readable medium 2622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method of deserializing electronic content having a first portion and a second portion, the method comprising:
   selecting a first node included in a data structure, the data structure representing, in a node-and-link representation, the first portion of electronic content, the data structure including a first external link being associated with the first node, the first external link referencing a first serialization, the first serialization representing the second portion of electronic content in a representation differing from the node-and-link representation of the data structure; and
   augmenting the data structure using the first serialization comprising:
      constructing a set of new nodes, the set of new nodes including a plurality of nodes constructible from the first serialization;
      selecting a target node from among the set of new nodes;
      inserting the target node into the data structure; and
      inserting a first inter-node link into the data structure, the first inter-node link connecting the first node and the target node, the first inter-node link corresponding to the first external link.

2. The method of claim 1, wherein the first serialization includes information facilitating construction of a node-and-link representation of the second portion of electronic content.

3. The method of claim 2, further comprising constructing inter-node links among the set of new nodes.

4. The method of claim 2, further comprising constructing an external link associated with at least one of the set of new nodes.

5. The method of claim 1, further comprising:
   accessing a second node included in the data structure, a second external link being associated with the second node, the second external link referencing the first serialization; and
   inserting a second inter-node link into the data structure, the second inter-node link connecting the second node and the target node, the second inter-node link corresponding to the second external link.

6. The method of claim 1, wherein the first external link includes information facilitating selection of the target node from among the set of new nodes.

7. The method of claim 1, wherein the first serialization includes information facilitating selection of the target node from among the set of new nodes.

8. The method of claim 1, wherein the first serialization includes second external link information from which a second external link is constructible and by which a source node is selectable from among the set of new nodes, and wherein the augmenting of the data structure using the first serialization includes:
   constructing a second external link; and
   associating the second external link with the source node.

9. The method of claim 1, wherein the first serialization includes second external link information from which a second external link is constructible and by which a source node is selectable from among the set of new nodes and a sink node is selectable from among the nodes included in the data structure, and wherein the augmenting the data structure using the first serialization includes:
   inserting a second inter-node link into the data structure, the second inter-node link connecting the source node and the sink node, the second inter-node link corresponding to the second external link.

10. The method of claim 1, wherein the first serialization includes second external link information from which a second external link is constructible and by which a source node is selectable from among nodes included in the data structure and a sink node is selectable from among the set of new nodes, and wherein the augmenting the data structure using the first serialization includes:
    inserting a second inter-node link into the data structure, the second inter-node link connecting the source node and the sink node, the second inter-node link corresponding to the second external link.

11. The method of claim 1, wherein the first serialization resides in a subfile in a compressed-directory file, the compressed-directory file containing information describing an electronic document of which the second portion of electronic content is a part.

12. The method of claim 1, wherein the first inter-node link is a bidirectional link between the first node and the target node.

13. The method of claim 1, wherein the first inter-node link is a unidirectional link from the first node to the target node.

14. The method of claim 1, wherein the first serialization represents the second portion of the electronic content in a representation using a markup language.

15. A computer system comprising:
    at least one memory storage device to store data in a data structure; and
    at least one processor to implement a rendering module to select a first node included in the data structure, the data structure representing, in a node-and-link representation, a first portion of electronic content, the data structure including a first external link being associated with the first node, the first external link referencing a first serialization, the first serialization representing a second portion of electronic content in a representation differing from the node-and-link representation of the data structure; and
    the at least one processor further to implement a deserialization module to deserialize the first serialization, the deserialization module to construct a set of new nodes, the set of new nodes including a plurality of nodes constructible from the first serialization, to select a target node from among the set of new nodes, to insert the target node into the data structure, and to insert a first inter-node link into the data structure, the first inter-node link connecting the first node and the target node, the first inter-node link corresponding to the first external link.

16. The system of claim 15, wherein the first serialization includes information facilitating construction of a node-and-link representation of the second portion of electronic content.

17. The system of claim 16, wherein the deserialization module is further to construct inter-node links among the set of new nodes.

18. The system of claim 16, wherein the deserialization module is further to construct an external link associated with at least one of the set of new nodes.

19. The system of claim 15, wherein the rendering module is further to access a second node included in the data structure, a second external link being associated with the second node, the second external link referencing the first serialization, and wherein the deserialization module is further to insert a second inter-node link into the data structure, the second inter-node link connecting the second node and the target node, the second inter-node link corresponding to the second external link.

20. The system of claim 15, wherein the first external link includes information facilitating selection of the target node from among the set of new nodes.

21. The system of claim 15, wherein the first serialization includes information facilitating selection of the target node from among the set of new nodes.

22. The system of claim 15, wherein the first serialization includes second external link information from which a second external link is constructible and by which a source node is selectable from among the set of new nodes, and wherein the deserialization module is further to constructing the second external link, and to associate the second external link with the source node.

23. The system of claim 15, wherein the first serialization includes second external link information from which a second external link is constructible and by which a source node is selectable from among the set of new nodes and a sink node is selectable from among the nodes included in the data structure, and wherein the deserialization module is further to insert a second inter-node link into the data structure, the second inter-node link connecting the source node and the sink node, the second inter-node link corresponding to the second external link.

24. The method of claim 15, wherein the first serialization includes second external link information from which a second external link is constructible and by which a source node is selectable from among nodes included in the data structure and a sink node is selectable from among the set of new nodes, and wherein the deserialization module is further to insert a second inter-node link into the data structure, the second inter-node link connecting the source node and the sink node, the second inter-node link corresponding to the second external link.

25. The system of claim 15, wherein the electronic content is an electronic document.

26. The system of claim 15, wherein the first serialization resides in a file in a directory, the directory containing information describing an electronic document of which the second portion of electronic content is a part.

27. The system of claim 26, wherein the electronic document is a page description language document.

28. The system of claim 15, wherein the first serialization resides in a file in a compressed-directory file, the compressed-directory file containing information describing an electronic document of which the second portion of electronic content is a part.

29. The system of claim 15, wherein the first inter-node link is a bidirectional link between the first node and the target node.

30. The system of claim 15, wherein the first inter-node link is a unidirectional link from the first node to the target node.

31. The system of claim 15, wherein the first serialization represents the second portion of electronic content in a representation using a markup language.

32. A machine-readable storage medium embodying instructions, which when executed by a machine, cause the machine to perform a method of deserializing electronic content having a first portion and a second portion, the method comprising:
  selecting a first node included in a data structure, the data structure representing, in a node-and-link representation, a first portion of electronic content, the data structure including a first external link being associated with the first node, the first external link referencing a first serialization, the first serialization representing a second portion of electronic content in a representation differing from the node-and-link representation of the data structure; and
  augmenting the data structure using the first serialization comprising:
    constructing a set of new nodes, the set of new nodes including a plurality of nodes constructible from the first serialization;
    selecting a target node from among the set of new nodes;
    inserting the target node into the data structure; and
    inserting a first inter-node link into the data structure, the first inter-node link connecting the first node and the target node, the first inter-node link corresponding to the first external link.

33. The machine-readable storage medium of claim 32, wherein the first serialization includes information facilitating construction of a node-and-link representation of the second portion of electronic content.

34. The machine-readable storage medium of claim 33, embodying further instructions, which when executed by a machine, cause the machine to perform the method further comprising constructing inter-node links among the set of new nodes.

35. The machine-readable storage medium of claim 32, embodying further instructions, which when executed by a machine, cause the machine to perform the method further comprising:
  accessing a second node included in the data structure, a second external link being associated with the second node, the second external link referencing the first serialization; and
  inserting a second inter-node link into the data structure, the second inter-node link connecting the second node and the target node, the second inter-node link corresponding to the second external link.

* * * * *